United States Patent
Konda et al.

(10) Patent No.: US 12,088,608 B2
(45) Date of Patent: Sep. 10, 2024

(54) METHODS AND APPARATUS TO ANALYZE TELEMETRY DATA OF A NETWORK DEVICE FOR MALICIOUS ACTIVITY

(71) Applicant: McAfee, LLC, San Jose, CA (US)

(72) Inventors: Tirumaleswar Reddy Konda, Bengaluru (IN); Shashank Jain, Bengaluru (IN); Abhishek Tripathi, Bangalore (IN); Piyush Pramod Joshi, Aurangabad (IN)

(73) Assignee: McAfee, LLC, San Jose, CA (US)

( * ) Notice: Subject to any disclaimer, the term of this patent is extended or adjusted under 35 U.S.C. 154(b) by 30 days.

(21) Appl. No.: 17/111,478

(22) Filed: Dec. 3, 2020

(65) Prior Publication Data

US 2022/0070193 A1   Mar. 3, 2022

(30) Foreign Application Priority Data

Aug. 28, 2020   (IN) .............................. 202011037213

(51) Int. Cl.
*H04L 9/40*   (2022.01)
*G06N 3/04*   (2023.01)
*G06N 3/08*   (2023.01)

(52) U.S. Cl.
CPC ........... *H04L 63/1425* (2013.01); *G06N 3/04* (2013.01); *G06N 3/08* (2013.01); *H04L 63/029* (2013.01); *H04L 63/1416* (2013.01)

(58) Field of Classification Search
CPC .............. H04L 63/1425; H04L 63/029; H04L 63/1416; H04L 63/101; G06N 3/04; G06N 3/08; G06N 3/0454

See application file for complete search history.

(56) References Cited

U.S. PATENT DOCUMENTS

| | | | |
|---|---|---|---|
| 11,128,438 B1 | 9/2021 | Konda et al. | |
| 11,356,472 B1* | 6/2022 | Maiorana | H04L 63/107 |
| 2006/0188081 A1* | 8/2006 | Hooper | H04M 15/56 |
| | | | 379/142.01 |
| 2008/0244074 A1* | 10/2008 | Baccas | G06F 21/56 |
| | | | 709/227 |
| 2009/0245176 A1* | 10/2009 | Balasubramanian | |
| | | | H04W 48/20 |
| | | | 370/328 |

(Continued)

OTHER PUBLICATIONS

T. Reddy, "MUD (D)TLS profiles for IoT devices," Internet-Draft, https://tools.ietf.org/html/draft-reddy-opsawg-mud-tls-01, Sep. 3, 2019, 17 pages.

(Continued)

*Primary Examiner* — Farid Homayounmehr
*Assistant Examiner* — Mudasiru K Olaegbe
(74) *Attorney, Agent, or Firm* — Hanley, Flight & Zimmerman, LLC

(57) ABSTRACT

Methods, apparatus, systems and articles of manufacture are disclosed to analyze telemetry data of a network device for malicious activity. An example apparatus includes an interface to obtain first telemetry data, a rules generator to, using the first telemetry data, generate a global block list using a machine learning model, the machine learning model generated based on a device specific block list and a device specific allow list, and a model manager to transmit the global block list to a gateway, the gateway to facilitate on-path classification of second telemetry data.

21 Claims, 19 Drawing Sheets

(56) References Cited

U.S. PATENT DOCUMENTS

| | | | | |
|---|---|---|---|---|
| 2011/0083176 | A1* | 4/2011 | Martynenko | G06F 21/56 726/13 |
| 2014/0237542 | A1* | 8/2014 | Baccas | H04L 67/56 726/1 |
| 2015/0279359 | A1* | 10/2015 | Velasco | G10L 15/02 704/257 |
| 2017/0343967 | A1* | 11/2017 | Verma | G05B 19/056 |
| 2019/0190928 | A1* | 6/2019 | Anderson | H04L 63/0876 |
| 2020/0314107 | A1 | 10/2020 | Joshi et al. | |
| 2021/0014247 | A1* | 1/2021 | Wosotowsky | H04L 63/1416 |
| 2021/0019403 | A1* | 1/2021 | Mehta | G06N 3/045 |
| 2021/0203521 | A1 | 7/2021 | Konda et al. | |
| 2021/0234833 | A1* | 7/2021 | Schneider | G06N 3/08 |
| 2021/0250349 | A1 | 8/2021 | Konda et al. | |
| 2021/0357648 | A1* | 11/2021 | Metaxas | G06F 17/15 |
| 2022/0006783 | A1* | 1/2022 | Hassanzadeh | H04L 63/0263 |
| 2022/0029803 | A1 | 1/2022 | Vijayanarayanan | |
| 2022/0200989 | A1 | 6/2022 | Andrews | |
| 2023/0156038 | A1 | 5/2023 | Konda et al. | |

OTHER PUBLICATIONS

Virustotal, https://www.virustotal.com/gui/, retrieved on Dec. 23, 2020, 2 pages.

D. Benjamin, "Applying GREASE to TLS Extensibility," Internet-Draft, https://tools.ietf.org/html/draft-ietf-tls-grease-02, Jan. 16, 2019, 11 pages.

SSL blacklist, "Blacklist," https://sslbl.abuse.ch/blacklist, retrieved on Dec. 23, 2020, 5 pages.

Anderson et al., "Deciphering Malware's use of TLS (without Decryption)," Cornell University, Jul. 6, 2016, https://arxiv.org/abs/1607.01639, 6 pages. (Abstract only provided).

GitHub, https://github.com/cisco/joy, retrieved on Dec. 23, 2020, 8 pages.

Sakurada et al., "Anomaly Detection Using Autoencoders with Nonlinear Dimensionality Reduction," MLSDA'14: Proceedings of the MLSDA 2014 2nd Workshop on Machine Learning for Sensory Data Analysis, 5 pages. (Abstract only provided).

Anderson et al., "TLS Beyond the Browser: Combining End Host and Network Data to Understand Application Behavior," IMC '19: Proceedings of the Internet Measurement ConferenceOct. 2019 pp. 379-392 https://doi.org/10.1145/3355369.3355601, 5 pages (Abstract only provided).

Lear et al., "Manufacturer Usage Description Specification," Internet Engineering Task Force (IETF), Request for Comments: 8520, Mar. 2019, 60 pages.

Reddy et al., "MUD (D)TLS Profiles for IoT Devices," IETF Trust Internet-Draft, https://tools.ietf.org/html/draft-reddy-opsawg-mud-tls-03, dated Jan. 29, 2020, 19 pages.

* cited by examiner

400

}

"SAN_list_length": [24, 5, 6],

"cert_list": ["WHALEXA;192.168.5.187;0x5638075a", "Amazon;US;Server CA 1B;Amazon", "Starfield Technologies, Inc.;US;Arizona;Scottsdale;Starfield Services Root Certificate Authority - G2", "WHALEXA;192.168.5.101;0x3cbb320b", "Amazon;US;Amazon Root CA 1"], "selected_ciphersuite": ["TLS_ECDHE_ECDSA_WITH_AES_256_GCM_SHA384"]

```
{
    "version_list": ["TLS 1.0"],

"pubkey_lengths": ["256", "128"],

"pubkey_algo": ["DH_DSS", "RSA"],

"SAN_list_length": [3, 99, 4, 8, 56],

"cert_list": ["UV;emob;deenesi;ropeezom.ca", "AE;ifoti;ezul;numee.ag",
    "YL;vizi;befopoov;boodedu.google", "SU;gujopotem;leelorex;buzeyol.tld",
    "KZ;mookuki;beefuwoo;adora.xxx", ..., "VY;ubuwool;bukasana;nuwa.ag"], "encryption_algorithms": ["TLS_ECDHE_RSA_WITH_RC4_128_SHA",
    "TLS_ECDHE_ECDSA_WITH_RC4_128_SHA", "TLS_DHE_RSA_WITH_CHACHA20_POLY1305_SHA256",
    "TLS_RSA_WITH_RC4_128_MD5", "TLS_ECDH_ECDSA_WITH_RC4_128_SHA",
    "TLS_ECDH_RSA_WITH_RC4_128_SHA", "TLS_RSA_WITH_RC4_128_SHA"], "extension_types": ["encrypt_then_mac"], "supported_groups": ["x25519"], "selected_ciphersuite": ["TLS_RSA_WITH_AES_128_CBC_SHA256",
    "TLS_ECDHE_ECDSA_WITH_AES_128_GCM_SHA256", "TLS_ECDHE_RSA_WITH_AES_256_CBC_SHA384", ...,
    "TLS_RSA_WITH_AES_256_CBC_SHA", "TLS_ECDHE_RSA_WITH_AES_128_CBC_SHA256"]
}
```

"version_list": ["TLS 1.0"],

"pubkey_lengths": ["65", "128", "256"],

"pubkey_algo": ["RSA", "DH_DSS"],

"SAN_list_length": [3, 99, 4, 8, 56],

"self_signed": [true],

"cert_list": ["VW;odeboo;otof;deezukesu.tld", "KZ;mookuki;beefuwoo;adara.xxx", "VY;ubuwoof;bukasana;nuwa.ag", "WW;WW;WW;WW;WW;WW", "HP;kefusuxoi;gooxof;sodlitige.cn", ..., "WZ;leevozei;xezaje;exepeene.tld"], "encryption_algorithms": ["TLS_DH_RSA_WITH_3DES_EDE_CBC_SHA", "TLS_DHE_RSA_WITH_CAMELLIA_128_CBC_SHA", "TLS_DHE_DSS_WITH_AES_256_GCM_SHA384", ..., "TLS_DHE_DSS_WITH_AES_256_CBC_SHA256"], "extension_types": ["heartbeat", "encrypt_then_mac"], "supported_groups": ["sect283k1", "brainpoolP384r1", "sect283r1", "brainpoolP256r1", "brainpoolP512r1", "sect409k1", "sect571r1", "sect409r1", "secp521r1", "secp256k1", "sect571k1"], "signature_algorithms": ["sha224_rsa", "sha1_ecdsa", "sha384_dsa", "sha256_dsa", "sha512_ecdsa", "sha1_dsa", "sha512_dsa", "sha224_ecdsa", "sha224_dsa"], "selected_ciphersuite": ["TLS_ECDHE_RSA_WITH_AES_256_GCM_SHA384", "TLS_ECDHE_RSA_WITH_AES_128_CBC_SHA256", ..., "TLS_ECDHE_ECDSA_WITH_AES_128_GCM_SHA256"]

METHODS AND APPARATUS TO ANALYZE TELEMETRY DATA OF A NETWORK DEVICE FOR MALICIOUS ACTIVITY

RELATED APPLICATIONS

This patent arises from a continuation of Indian Patent Application Serial No. 202011037213, entitled "METHODS AND APPARATUS TO ANALYZE TELEMETRY DATA OF A NETWORK DEVICE FOR MALICIOUS ACTIVITY," filed on Aug. 28, 2020, is hereby incorporated herein by reference in their entireties. Priority to Indian Patent Application Serial No. 202011037213 is hereby claimed.

FIELD OF THE DISCLOSURE

This disclosure relates generally to malware detection, and, more particularly, to methods and apparatus to analyze telemetry data of a network device for malicious activity.

BACKGROUND

Malware (e. g, viruses, worms, trojans, ransomware) is malicious software that is disseminated by attackers to launch a wide range of security attacks, such as stealing user's private information, hijacking devices remotely to deliver massive spam emails, infiltrating a user's online account credentials, etc. The introduction of malware to a computing system may cause serious damages and significant financial loss to computer and/or Internet users.

BRIEF DESCRIPTION OF THE DRAWINGS

FIG. 4 is an illustration of example pseudocode for a first example device specific allow list.

FIG. 6 is an illustration of example pseudocode for a first example device specific block list.

FIG. 7 is an illustration of example pseudocode for a second example device specific block list.

Figure 1:
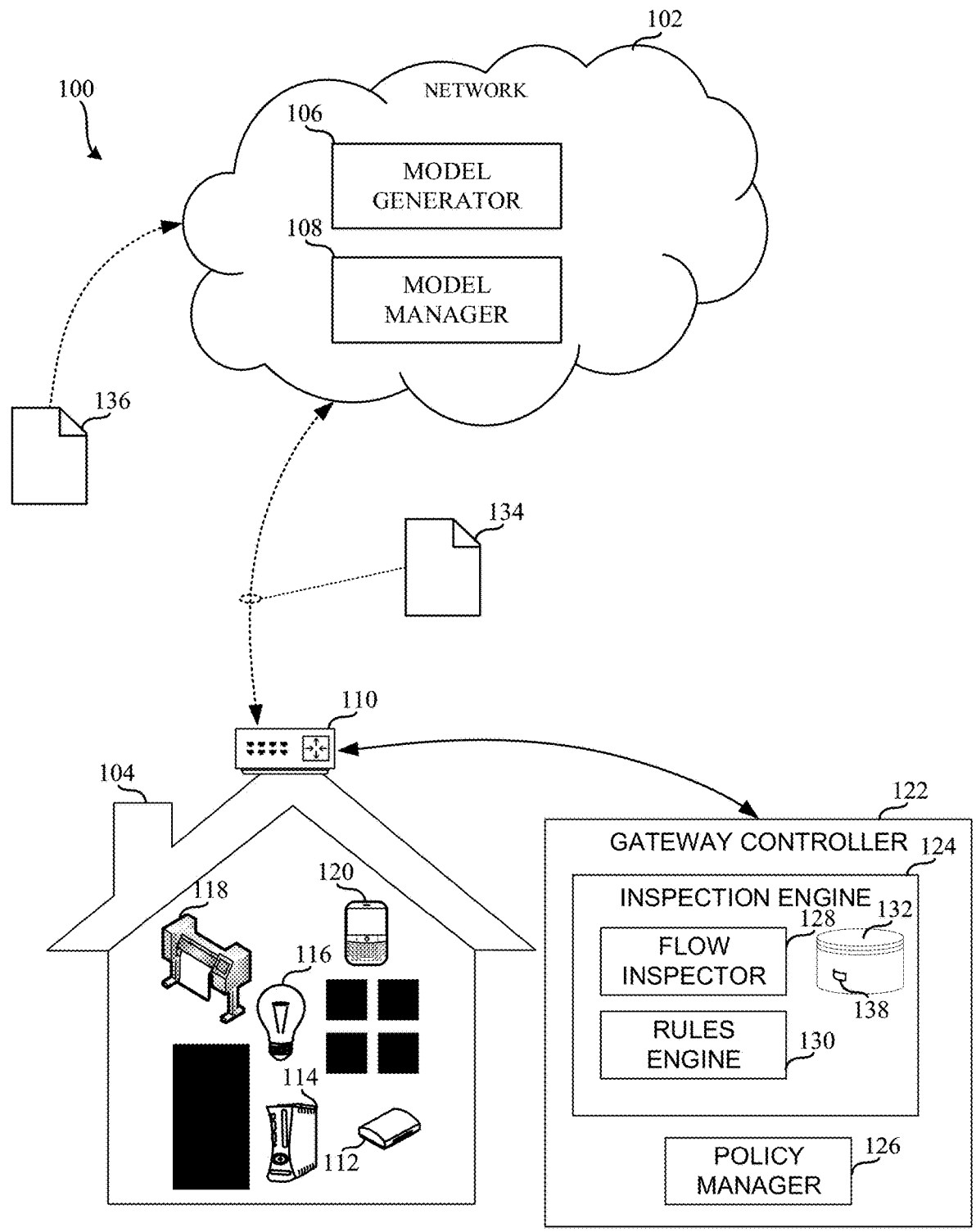
FIG. 1 is a block diagram of an example environment configured to verify telemetry data.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays

DETAILED DESCRIPTION

Today, Internet of Things (IoT) devices (e.g., smart televisions, smart thermostats, automatic lightbulbs, etc.) are implemented and used in both home and enterprise networks. Traditionally, when manufacturing an IoT device, such an IoT device manufacturer does not provide host security (e.g., an anti-malware software operating on the IoT device). Accordingly, many IOT devices shipped and implemented in a home or enterprise network may have various security vulnerabilities. For example, an IOT device has the potential to be hacked via receiving spoof certificates, thereby causing the IOT device to fail to certify the security certificate.

To protect such IoT devices from the various security vulnerabilities, protocols such as Transport Layer Security (TLS) and Datagram Transport Layer Security (DTLS) are used to provide encryption for IoT device communication traffic. With many IoT devices using TLS or DTLS security protocols, malware is developed to utilize the same TLS or DTLS security protocols, thus thwarting network-based analysis. For example, because malware has been transmitted using TLS or DTLS security protocols, the communication traffic (e.g., network flow) is encrypted and traditional network-based analysis such as deep packet inspection (DPI) is not as viable.

Network devices in a home network (e.g., McAfee® Secure Home Platform (SHP)) provide network security to protect devices connected to a home network from both external and/or internal attacks. However, such a security approach is challenging to implement on IoT devices because a root certificate cannot be easily installed on IoT devices in a home network to enable a middle box to act as a TLS proxy.

In some approaches to protect IoT devices, SHP creates Manufacturer Usage Description (MUD) rules to enable intended use and disable non-intended use (e.g., malicious behavior). However, MUD rules are typically created by SHP for use with headless IoT device (e.g., a device without a user interface (UI)). Such an approach is not efficient for IoT devices with broad communication patterns. Example devices with broad communication patterns are voice assistants such as AMAZON ECHO™ or GOOGLE HOME™, streaming services such as a CHOMECAST™ device, a FIRE TV™ Stick, a ROKU® STREAMING STICK®, etc.

Examples disclosed herein overcome such deficiencies by collecting telemetry data resulting from network flows (e.g., telemetry flows, flows, etc.) between an IoT device (e.g., a client device) and a server. In examples disclosed herein, the telemetry data included in the network flow may be example TLS handshake parameters such as, for example, encryption algorithms, cipher suites, supported groups, etc. Examples disclosed herein include generating, based on the telemetry data, (a) a global block list of rules, (b) a device specific block list of rules, and (c) a device specific allow list of rules. Accordingly, examples disclosed herein provide on-path detection by utilizing such generated (a) a global block list of rules, (b) a device specific block list of rules, and (c) a device specific allow list of rules when analyzing subsequent telemetry data in a home network. In addition, examples disclosed herein provide on-path detection by utilizing a devices specific lightweight machine learning model.

Examples disclosed herein generate and/or otherwise train two machine learning models. Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, lightweight (e.g., logistic regression) and full neural network models are used. In general, machine learning models/architectures that are suitable to use in the example approaches disclosed herein will be logistic regression models and/or auto encoders. However, other types of machine learning models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determines prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using supervised learning. However, any other training algorithm may additionally or alternatively be used. In examples disclosed herein, training is performed in a cloud network. Training is performed using hyperparameters that control how the learning is performed (e.g., a learning rate, a number of layers to be used in the machine learning model, etc.). In some examples re-training may be performed. Such re-training may be performed in response to additional input data becoming available, etc.

Training is performed using training data. In examples disclosed herein, the training data originates from third-party sources that identify whether telemetry data is benign or malicious. In other examples, training data for benign flows is obtained and/or otherwise originates from telemetry data collected from IoT devices across various home network (e.g., a McAfee® Secure Home Platform (SHP)) deployments. In some examples, training data for benign flows is obtained from device profiles generated and/or otherwise maintained by a monitoring entity. As used herein, a monitoring entity may be a device manufacturer, a software provider (e.g., McAfee®, a device update agent, etc.), and/or any suitable entity configured to analyze network flows to and/or from an IoT device. For example, training data for benign flows may be obtained in a McAfee® laboratory environment configured to analyze flows of IoT devices across various home network (e.g., a McAfee® Secure Home Platform (SHP)) deployments. In examples disclosed herein, training data for malicious flows may be obtained from a threat detection entity such as, for example, McAfee® Advance Threat Detection (ATD) team, and/or any suitable third-party source. Because supervised training is used, the training data is labeled. Labeling is applied to the training data by the third-party source.

Once training is complete, the model is deployed for use as an executable construct that processes an input and provides an output based on the network of nodes and connections defined in the model. The model is stored at a cloud network, and on a gateway controller of a gateway. The model may then be executed by the gateway controller.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Accordingly, examples disclosed herein utilize the training data (e.g., observable TLS parameters obtained from IoT devices across various home networks, monitoring entities, threat detection entities, third-party sources, etc.) to generate and/or otherwise train a device specific lightweight machine learning model and a full machine learning model. In examples disclosed herein, the (a) device specific lightweight machine learning model, (b) the global block list of rules, (c) the device specific block list of rules, and (d) the device specific allow list of rules are transmitted to a gateway to perform on-path detection. In examples disclosed herein, the device specific block list of rules, the device specific allow list of rules, and the device specific lightweight machine learning model are dynamically transmitted to a gateway in the event such a gateway facilitates network flows of the corresponding device.

In the event on-path detection of telemetry data is unsuccessful at the gateway, the telemetry data is transmitted back to the cloud network for off-path processing (e.g., performing off-path detection). On-path detection may be unsuccessful if, for example, the telemetry data cannot be classified using (a) the device specific lightweight machine learning model, (b) the global block list of rules, (c) the device specific block list of rules, and (d) the device specific allow list of rules. In this manner, the full neural network model is not stored at the gateway, thus conserving memory utilization and computer processing resources in the gateway. Similarly, the lightweight machine learning model, the device specific block list of rules, and the device specific allow list of rules are device specific and, thus, the gateway only stores and/or otherwise obtains the lightweight machine learning model, the device specific block list of rules, and the device specific allow list of rules for devices present in the home network. In this manner, memory utilization and computer processing resources are reserved in the gateway for a device specific allow list, a device specific block list, and the lightweight machine learning model for the devices in the home network.

Examples disclosed herein further provide enforcement during on-path and/or off-path detection. In examples disclosed herein, obtained telemetry data by a gateway is checked against (a) the global block list of rules, (b) the device specific block list of rules, and (c) the device specific allow list of rules to determine whether to approve or block the telemetry data. In examples disclosed herein, in the event the telemetry data cannot be classified using (a) the global block list of rules, (b) the device specific block list of rules, and (c) the device specific allow list of rules, the telemetry data is passed through the device specific lightweight machine learning model. In examples disclosed herein, such a device specific lightweight machine learning model may be referred to as a lightweight machine learning model. Such a lightweight machine learning model is utilized by the gateway during on-path analysis to generate a score identifying how likely the telemetry data is benign or malicious.

In examples disclosed herein, in the event the score generated by using the lightweight machine learning model does not satisfy a threshold, the telemetry data is transmitted to the cloud network for off-path analysis using the full neural network. In examples disclosed herein, the output of the full neural network is transmitted to the gateway for use in processing the telemetry data and/or performing action on the corresponding network flow (e.g., isolating the corresponding network device, etc.).

FIG. 1 is a block diagram of an example environment 100 configured to verify telemetry data. In FIG. 1, the environment 100 includes an example network 102 and an example connectivity environment 104. The example network 102 includes an example model generator 106 and an example model manager 108. The example connectivity environment 104 includes an example gateway 110, a first example network device 112, a second example network device 114, an example third example network device 116, a fourth example network device 118, and a fifth example network device 120. The example gateway 110 includes an example gateway controller 122.

In the example illustrated in FIG. 1, the network 102 is a wireless communications network. For example, the network 102 is a cloud network configurable to communicate with the gateway controller 122 of the gateway 110. In other examples disclosed herein, the network 102 may be implemented using wired communications (e.g., a local area network (LAN)) and/or any suitable combination of wired and/or wireless communication networks. In examples disclosed herein, the network 102 is an external network from to the gateway 110.

In the example illustrated in FIG. 1, the connectivity environment 104 is represented as a residential household. In such an example, the connectivity environment 104 includes the first network device 112, the second network device 114, the third network device 116, the fourth network device 118, and the fifth network device 120. Any number of network devices may be present in the connectivity environment 104. The connectivity environment 104 further includes the gateway 110. In this manner, the gateway 110 communicates example telemetry data 134 to the network 102. In examples disclosed herein, the telemetry data 134 may be telemetry data and/or parameters (e.g., TLS parameters) within a network flow. Further, such telemetry data 134 may include telemetry data corresponding to any of the first network device 112, the second network device 114, the third network device 116, the fourth network device 118, and the fifth network device 120 identified by the gateway controller 122.

In the example illustrated in FIG. 1, the model generator 106 is configured to obtain the example third-party telemetry data 136 and/or the example telemetry data 134 from the gateway 110. In this manner, the example model generator 106 aggregates the third-party telemetry data 136 and the telemetry data 134 associated with any of the first network device 112, the second network device 114, the third network device 116, the fourth network device 118, and the fifth network device 120. In examples disclosed herein, the third-party telemetry data 136 may be obtained from a third-party source such as, for example, McAfee® Advance Threat Detection (ATD) team, VirusTotal, etc. In this manner, the model generator 106 uses the third-party telemetry data 136 and the telemetry data 134 to generate (a) a global block list, (b) a device specific block list, and (c) a device specific allow list. In examples disclosed herein, the global block list is a list of TLS parameters known to be indicative of malicious activity. Such an example global block list is device agnostic (e.g., applicable to any network device).

In examples disclosed herein, despite multiple different profiles existing for each of the first network device 112, the second network device 114, the third network device 116, the fourth network device 118, and the fifth network device 120, the model generator 106 can determine certain TLS parameters (e.g., encryption algorithms, selected cipher suites, supported groups, etc.) that are present in any of the first network device 112, the second network device 114, the third network device 116, the fourth network device 118, and the fifth network device 120 profiles, but not in any known malicious profiles. Similarly, the model generator 106 can identify TLS parameters that are known to be associated with malicious profiles and, thus, include such TLS parameters in the device specific block list.

Additionally, the model generator 106 utilizes the third-party telemetry data 136, the telemetry data 134, and/or any suitable TLS parameter (e.g., observable TLS parameters obtained from IoT devices across various home network, monitoring entities, a threat detection entity, a third-party source, etc.) to generate and/or otherwise train two neural network models. In examples disclosed herein, a first neural network model of the two neural network models is a lightweight machine learning model, and a second neural network model of the two neural network models is a full neural network model. While examples disclosed herein describe a lightweight machine learning model (e.g., a device specific lightweight machine learning model) and a full neural network model, any suitable number of machine learning models may be used to implement either the device specific lightweight machine learning model and/or the full neural network model. For example, the full neural network model may be implemented using a first full neural network model (e.g., a first auto encoder) for use in determining whether a flow is benign and a second full neural network model (e.g., a second auto encoder) for use in determining whether a flow is malicious. In other examples, a lightweight machine learning model may be generated for each IoT device. In yet another example, such a lightweight machine learning model may be implemented using multiple machine learning models. In some examples disclosed herein, the global block list may be generated in response to the generation and/or otherwise training of the two neural network models.

In examples disclosed herein, the model generator 106 transmits the global block list, device specific block list, device specific allow list, and the lightweight machine learning model to the model manager 108. In addition, the model manager 108 transmits the global block list, device specific block list, device specific allow list, and the lightweight machine learning model to the gateway 110 for use by the gateway controller 122. Additional description of the model generator 106 is described below, in connection with FIG. 2.

In the example of FIG. 1, the example model manager 108 obtains the global block list, device specific block list, device specific allow list, and the lightweight machine learning model from the model generator 106. In this manner, the model manager 108 can transmit the global block list, the device specific block list, the device specific allow list, and the lightweight machine learning model to the gateway 110 for use by the gateway controller 122. In examples disclosed herein, the model manager 108 dynamically transmits the device specific block list, device specific allow list, and the lightweight machine learning model to the gateway 110 for use by the gateway controller 122. For example, though the model manager 108 may include a device specific block list, a device specific allow list, and a lightweight machine learning model for a first type of network device (e.g., a first make and/or a first model of the first type of network device), the model manager 108 may wait to transmit the device specific block list, the device specific allow list, and the lightweight machine learning model for the first type of network device (e.g., a first make and/or a first model of the first type of network device) to the gateway 110 until identifying that the gateway 110 is facilitating network flows of the first type of network device. In examples disclosed herein, the model manager 108 manages subscriptions and policies (e.g., global block list, device specific block list, device specific allow list, and the lightweight machine learning model) for the connectivity environment 104. In examples disclosed herein, the model manager 108 stores and manages the subscriptions and policies corresponding to the network devices 112, 114, 116, 118, 120 in the connectivity environment 104. Additional description of the model manager 108 is described below, in connection with FIG. 3.

The example gateway 110 of the illustrated example of FIG. 1 is a router that enables any of the first network device 112, the second network device 114, the third network device 116, the fourth network device 118, the fifth network device 120, and/or the gateway controller 122 to communicate with the network 102 and/or the Internet. In examples disclosed herein, the gateway 110 may transmit a request to the network 102 to obtain a device specific allow list, a device specific block list, and a lightweight machine learning model for each network device in the connectivity environment 104. The gateway 110 stores and/or otherwise obtains the lightweight machine learning model, the device specific block list of rules, and the device specific allow list of rules for devices present in the home network. In this manner, memory utilization and computer processing resources are reserved in the gateway 110 for a device specific allow list, a device specific block list, and the lightweight machine learning model for the devices in the connectivity environment 104.

In the example illustrated in FIG. 1, the first network device 112, the second network device 114, the third network device 116, the fourth network device 118, and the fifth network device 120 are IoT device. In the example illustrated in FIG. 1, the first network device 112 is a gaming console, the second network device 114 is a gaming console, the third network device 116 is a lighting element, the fourth network device 118 is a plotter, and the fifth network device 120 is a personal organizer. While, in the illustrated example, an Internet enabled gaming console, lighting element, plotter, and personal organizer are shown, any other type(s) and/or number(s) of network device(s) may additionally or alternatively be used. For example, Internet-enabled mobile handsets (e.g., a smartphone), tablet computers (e.g., an iPad®, a Google Nexus, etc.) digital media players (e.g., a Roku® media player, a Slingbox®, etc.,) thermostat, etc. may additionally or alternatively be implemented. Further, while in the illustrated example five network devices are shown, any number of network devices may be implemented. While in the illustrated example, the network devices 112, 114, 116, 118, 120 are wireless devices (e.g., connected to the Internet via a wireless communications method) any of the network devices 112, 114, 116, 118, 120 may be wired devices (e.g., connected to Internet via a wired connection such as, for example, an Ethernet connection).

In the example of FIG. 1, the example gateway controller 122 is a processing device configured within the gateway 110. In FIG. 1, the gateway controller 122 includes an example inspection engine 124 and an example policy manager 126. The example inspection engine 124 includes an example flow inspector 128, an example rules engine 130, and an example model store 132. In operation, the gateway controller 122 facilitates communications to and/or from the network 102 and/or any of the first network device 112, the second network device 114, the third network device 116, the fourth network device 118, and the fifth network device 120. The example gateway controller 122 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In some examples disclosed herein, the example gateway controller 122 of FIG. 1 may be referred to as example means for controlling.

In the example of FIG. 1, the inspection engine 124 includes the example flow inspector 128, the example rules engine 130, and the example model store 132. The inspection engine 124 is a TLS inspection engine that inspects network flows of the network devices 112, 114, 116, 118, 120 to identify corresponding telemetry data of the network device 112, 114, 116, 118, 120. In this manner, the inspection engine 124 protects against common TLS-based threats (e.g., the use of expired certificates, revoked-certificates, etc.). The example inspection engine 124 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In some examples disclosed herein, the example inspection engine 124 may be referred to as example means for inspecting.

The example policy manager 126 of FIG. 1 is configured to obtain classification results from the rules engine 130 and either block or allow the corresponding network flow. For example, the policy manager is configured to, in response to the rules engine 130 transmitting an indication indicating that telemetry data is malicious, block the corresponding network flow.

In some examples disclosed herein, the policy manager 126 may determine whether a classification result from the network 102 is obtained. For example, in the event off-path classification is initiated, the policy manager 126 may wait to obtain a classification result from the network 102. In the event the policy manager 126 determines the result from the network is obtained, the policy manager 126 stores and/or otherwise updates the result as a policy. Such a policy may indicate to allow the corresponding network flow, block the corresponding network flow, isolate the corresponding network device, etc. The example policy manager 126 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In some examples disclosed herein, the example policy manager 126 may be referred to as example means for managing.

In the example of FIG. 1, the flow inspector 128 is configured to identify, sniff, determine, and/or otherwise obtain example telemetry data and/or parameters within a network flow transmitted by any of the network devices 112, 114, 116, 118, 120. In examples disclosed herein, the flow inspector 128, upon identifying telemetry data and/or parameters within a network flow from any of the network devices 112, 114, 116, 118, 120 notifies the rules engine 130 and stores the corresponding telemetry data in the model store 132. The example flow inspector 128 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In some examples disclosed herein, the example flow inspector 128 may be referred to as example means for identifying.

In the example illustrated in FIG. 1, the rules engine 130 maintains the device specific block list, and the device specific allow list corresponding to each of the network devices 112, 114, 116, 118, 120. Additionally, the rules engine 130 is configured to maintain the global block list generated by the model generator 106. For example, to maintain the device specific block list, the device specific allow list, and the global block list, the rules engine 130 is configured to dynamically obtain such lists from the network 102. In an example operation, the rules engine 130 is configured to obtain the telemetry data from the flow inspector 128. In response to obtaining the telemetry data from the flow inspector 128, the rules engine 130 performs a first check of the telemetry data to determine whether a parameter of the telemetry data matches the global block list. In the event the rules engine 130 determines that a parameter of the telemetry data matches the global block list, the rules engine 130 indicates to the policy manager 126 to block the corresponding flow.

Alternatively, in the event the rules engine 130 determines that a parameter of the telemetry data does not match the global block list, the rules engine 130 determines whether a parameter of the telemetry data matches the device specific block list. In the event the rules engine 130 determines that a parameter of the telemetry data matches the device specific block list, the rules engine 130 indicates to the policy manager 126 to block the corresponding flow.

Alternatively, in the event the rules engine 130 determines that a parameter of the telemetry data does not match the device specific block list, the rules engine 130 determines whether a parameter of the telemetry data matches the device specific allow list. In the event the rules engine 130 determines that a parameter of the telemetry data matches the device specific allow list, the rules engine 130 indicates to the policy manager 126 to allow the corresponding flow. In the event the rules engine 130 determines that a parameter of the telemetry data does not match the device specific allow list, then the rules engine 130 utilizes the example lightweight machine learning model 138 corresponding to the associated network device to identify a corresponding score.

In examples disclosed herein, the lightweight machine learning model 138 is stored in the model store 132 after being transmitted by the model manager 108. In examples disclosed herein, a separate lightweight machine learning model is stored for each of the network devices 112, 114, 116, 118, 120. The lightweight machine learning model 138 includes a set of TLS parameters and corresponding weights associated with the likelihood that such TLS parameters are benign or malicious. For example, the lightweight machine learning model 138 may be an example Logistic Regression model. In an example operation, the rules engine 130 executes the lightweight machine learning model 138 using the parameters in the telemetry data. As a result, the rules engine 130 obtains a probability score ranging from 0 to 1, where 0 indicates a benign flow and 1 indicates a malicious flow. Examples disclosed herein include an example benign threshold and an example malicious threshold. In response to obtaining the result, the rules engine 130 determines whether the probability score satisfies the benign threshold. For example, the probability score may satisfy the benign threshold when the probability score is below a benign threshold value (e.g., below 0.2, etc.). In such an example, the corresponding telemetry data may be classified as benign and allowed. Additionally, in such an example, the telemetry data corresponding to the recently classified benign flow is transmitted, along with the classification, to the model generator 106 for further processing and re-training of the lightweight machine learning model 138 and/or the full machine learning model.

Alternatively, in the event the rules engine 130 determines the probability score does not satisfy the benign threshold, the rules engine 130 then determines whether the probability score satisfies the malicious threshold. For example, the probability score may satisfy the malicious threshold when the probability score is above a malicious threshold value (e.g., above 0.75, etc.). In such an example, the corresponding telemetry data may be classified as malicious and blocked. Additionally, in such an example, the telemetry data corresponding to the recently classified malicious flow is transmitted, along with the classification, to the model generator 106 for further processing and re-training of the lightweight machine learning model 138 and/or the full machine learning model.

In some examples disclosed herein, the rules engine 130 may determine that the telemetry data satisfies neither the benign threshold nor the malicious threshold. In such an example, the telemetry data is transmitted to the model generator 106 to perform off-path classification of the telemetry data (e.g., for execution using the full neural network model).

The example rules engine 130 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In some examples disclosed herein, the example rules engine 130 may be referred to as example means for rule generating.

In the example illustrated in FIG. 1, the model store 132 is configured to store the lightweight machine learning model 138 obtained from the model manager 108. Additionally, the model store 132 may store any suitable data such as, for example, the telemetry data observed by the flow inspector 128, parameters of the corresponding telemetry data, classification results of the rules engine 130, etc. The example model store 132 of the illustrated example of FIG. 1 may be implemented by any device for storing data such as, for example, flash memory, magnetic media, optical media, etc. Furthermore, the data stored in the example model store 132 may be in any data format such as, for example, binary data, comma delimited data, tab delimited data, structured query language (SQL) structures, etc.

Figure 2:
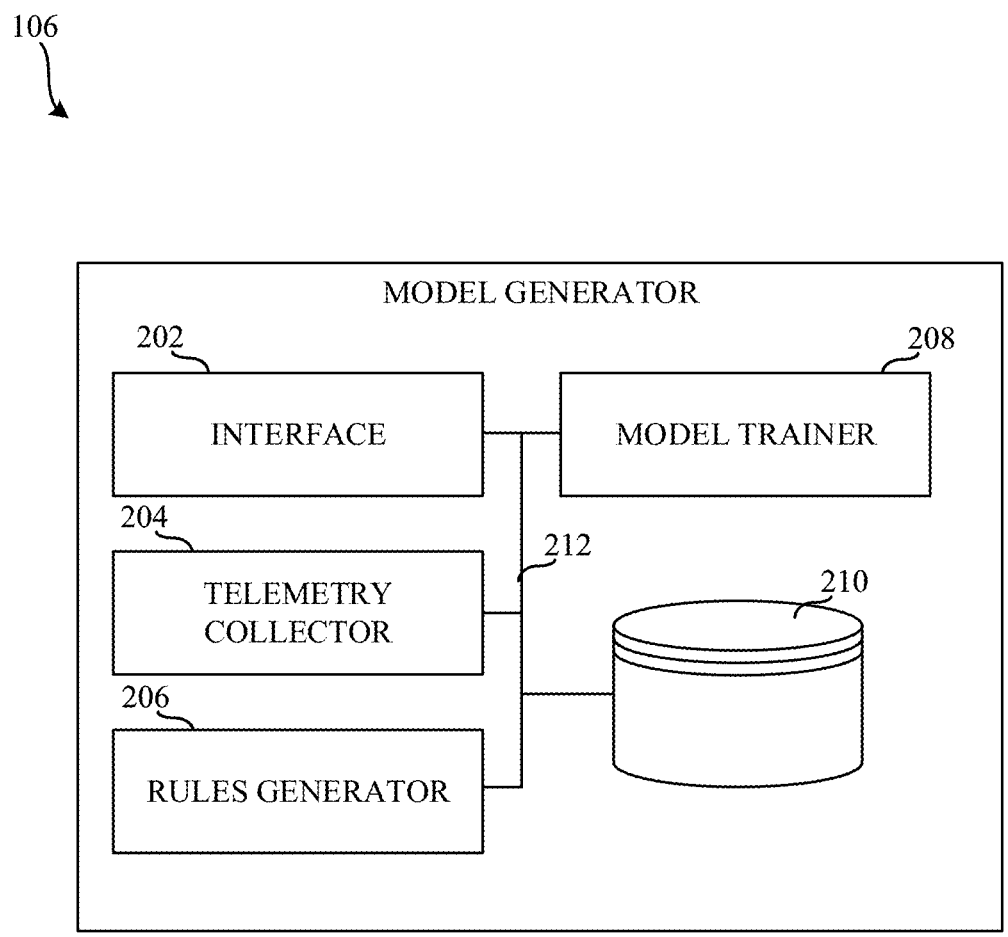
FIG. 2 is a block diagram of the example model generator of FIG. 1.

FIG. 2 is a block diagram of the example model generator 106 of FIG. 1. In the example of FIG. 2, the model generator 106 includes an example interface 202, an example telemetry collector 204, an example rules generator 206, an example model trainer 208, an example data store 210. In operation, any of the interface 202, the telemetry collector 204, the rules generator 206, the model trainer 208, and/or the data store 210 may communicate via an example communication bus 212. The example communication bus 212 may be implemented using any suitable wired and/or wireless communication method and/or apparatus.

In FIG. 2, the example interface 202 is configured to obtain the example third-party telemetry data 136 from a third-party source and/or the example telemetry data 134 from the gateway 110. In this manner, the example interface 202 forwards and/or otherwise transmits such third-party telemetry data 136 and/or telemetry data 134 to the telemetry collector 204. In some examples disclosed herein, the interface 202 may obtain telemetry data from the gateway 110 in response to the gateway performing unsuccessful on-path classification. Accordingly, in such an example, the interface 202 forwards such telemetry data to the telemetry collector 204. The example interface 202 of the illustrated example of FIG. 2 is a communication interface that receives and/or transmits corresponding communications to and/or from the gateway 110 and/or a third-party source. In the illustrated example, the interface 202 is implemented by a WiFi radio that communicates with the example gateway 110. In some examples, the interface 202 facilitates wired communication via an Ethernet network. In other examples disclosed herein, any other type of wired and/or wireless transceiver may additionally or alternatively be used to implement the interface 202.

In the example illustrated in FIG. 2, the telemetry collector 204 aggregates the third-party telemetry data 136 and the telemetry data 134 associated with any of the first network device 112, the second network device 114, the third network device 116, the fourth network device 118, and the fifth network device 120. In some examples disclosed herein, the telemetry collector 204 is configured to transmit a request to a third-party source to obtain example third-party telemetry data 136. Such a request may be transmitted through the interface 202. The example telemetry collector 204 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In some examples disclosed herein, the example telemetry collector 204 may be referred to as example means for collecting.

In the example illustrated in FIG. 2, the rules generator 206 is configured to, in response to obtaining the third-party telemetry data 136 and the telemetry data 134, generate (a) a global block list, (b) a device specific block list, and (c) a device specific allow list. In examples disclosed herein, the global block list is a list of TLS parameters known to be indicative of malicious activity. Such an example global block list is device agnostic (e.g., applicable to any network device). Accordingly, the rules generator 206 may wait to generate the global block list until the machine learning models are generated and/or otherwise trained by the model trainer 208.

To generate the example device specific block list and/or the example device specific allow list, the rules generator 206 determines certain TLS parameters (e.g., encryption algorithms, selected cipher suites, supported groups, etc.) that are present in any of the first network device 112, the second network device 114, the third network device 116, the fourth network device 118, and the fifth network device 120 profiles, but not in any known malicious profiles. Similarly, the rules generator 206 can identify TLS parameters that are known to be associated with malicious profiles and, thus, include such TLS parameters in the device specific block list.

Accordingly, in such an example, the rules generator 206 constructs (a) a global block list indicating telemetry data known to be malicious, (b) a device specific block list indicating telemetry data associated with a specific network device (e.g., any of the network devices 112, 114, 116, 118, 120) known to be malicious, and (c) a device specific allow list indicating telemetry data associated with a specific network device (e.g., any of the network devices 112, 114, 116, 118, 120) know to be benign. In examples disclosed herein, the rules generator 206 may generate (a) a global block list indicating telemetry data known to be malicious, (b) a device specific block list indicating telemetry data associated with a specific network device (e.g., any of the network devices 112, 114, 116, 118, 120) known to be malicious, and (c) a device specific allow list indicating telemetry data associated with a specific network device (e.g., any of the network devices 112, 114, 116, 118, 120) know to be benign for only the network devices located in the connectivity environment 104. However, in other examples disclosed herein, telemetry data for any suitable network device may be analyzed and processed by the rules generator 206. The example rules generator 206 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In the example illustrated in FIG. 2, the model trainer 208 utilizes the third-party telemetry data 136 and the telemetry data 134 to generate and/or otherwise train two neural network models. In examples disclosed herein, a first neural network model of the two neural network models is a device specific lightweight machine learning model, and a second neural network model of the two neural network models is a full neural network model.

In some examples disclosed herein, the model trainer 208 performs off-path classification. That is, in the event the gateway 110 of FIG. 1 is unable to classify telemetry data as benign or malicious (e.g., neither the benign nor the malicious thresholds are satisfied), the model trainer 208 performs off-path classification using the full neural network model. In examples disclosed herein, the result of off-path classification (e.g., a classification indicating whether the telemetry data is benign or malicious) is transmitted back to the gateway 110. In this manner, the gateway 110 may take appropriate action (e.g., isolate the network device 112, 114, 116, 118, 120 in which the corresponding network flow originated, block the corresponding network flow in the event the classification is malicious, etc.).

In examples disclosed herein, the full neural network model is generated using auto-encoders (AEs) and, thus, any classification model such as, for example, decision tree, deep learning etc., can be used. Traditionally, there are multiple methods to use an AE (e.g., the full neural network model) for classification. For example, the AE (e.g., the full neural network model) can be used as a pre-processing tool to learn a low-dimensional embedding of the telemetry data before training. In another example, the AE (e.g., full neural network model) can be used as an anomaly detection tool based on a reconstruction error. In examples disclosed herein, the model trainer 208 uses a reconstruction error (RE) based threshold to find determine whether incoming telemetry data is malicious or benign. In this manner, the model trainer 208 uses an auto encoder based machine learning model to maintain high operational efficiency in the event there are not enough labeled input samples for both benign and malicious telemetry data.

In an example training operation, the model trainer 208 trains the lightweight machine learning model and the full neural network model. In examples disclosed herein, the model trainer 208 trains the full neural network model (e.g., one or more auto encoders) adjusting the weights of various neurons in the full neural network model in response to a feedback signal generated as a result of executing the full neural network model. For example, the feedback signal may be an example reconstruction error and, as such, the model trainer 208 may train the full neural network model (e.g., one or more auto encoders) by computing a reconstruction error and comparing such an error with a reconstruction error threshold to determine the class (e.g., benign or malicious) of new telemetry data. Once the lightweight machine learning model and the full neural network model are trained and/or otherwise generated, the model trainer 208 transmits such models to be stored in the data store 210. In this manner, the interface 202 can obtain the lightweight machine learning model for transmission to the gateway 110. The example model trainer 208 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In the example illustrated in FIG. 2, the data store 210 is configured to store the lightweight machine learning model and full neural network model generated and/or otherwise trained by the model trainer 208. The example data store 210 of the illustrated example of FIG. 1 may be implemented by any device for storing data such as, for example, flash memory, magnetic media, optical media, etc. Furthermore, the data stored in the example data store 210 may be in any data format such as, for example, binary data, comma delimited data, tab delimited data, structured query language (SQL) structures, etc.

Figure 3:
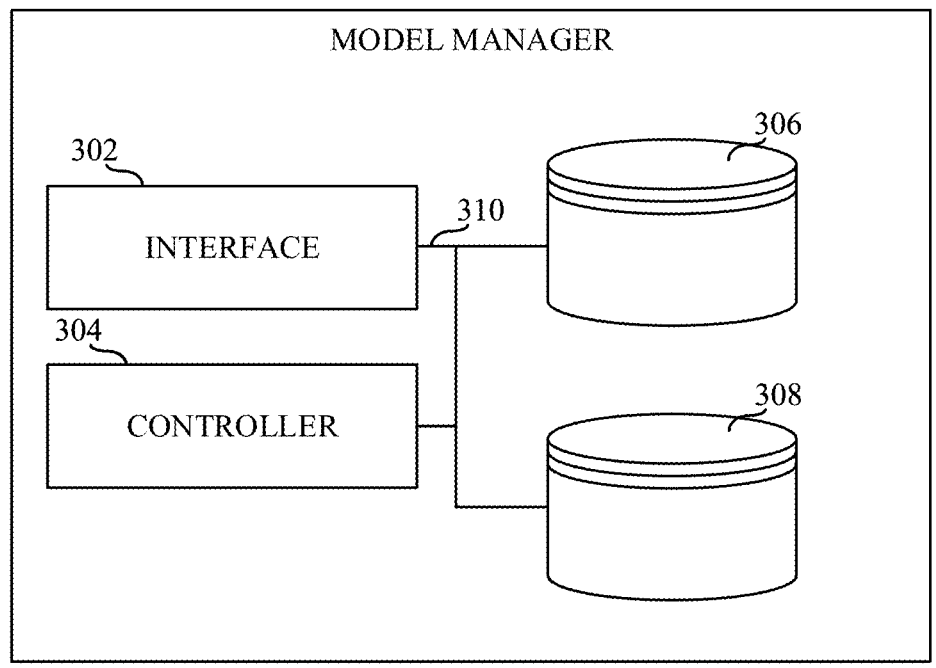
FIG. 3 is a block diagram of the example model manager of FIG. 1.

FIG. 3 is a block diagram of the example model manager 108 of FIG. 1. In the example of FIG. 3, the model manager 108 includes an example interface 302, an example controller 304, an example first data store 306, and an example second data store 308. In operation, any of the interface 302, the controller 304, the first data store 306, and/or the second data store 308 may communicate via an example communication bus 310. The example communication bus 310 may be implemented using any suitable wired and/or wireless communication method and/or apparatus.

In FIG. 3, the example interface 302 is configured to obtain the global block list, the device specific allow list, the device specific block list, and the lightweight machine learning model from the model generator 106. In this manner, the interface 302 transmits the lightweight machine learning model to be stored in the first data store 306. Additionally, the interface 302 transmits the global block list, the device specific allow list, and the device specific block list to be stored in the second data store 308. The example interface 302 of the illustrated example of FIG. 3 is a communication interface that receives and/or transmits corresponding communications to and/or from the gateway 110 and/or a third-party source. In the illustrated example, the interface 302 is implemented by a WiFi radio that communicates with the example gateway 110. In some examples, the interface 302 facilitates wired communication via an Ethernet network. In other examples disclosed herein, any other type of wired and/or wireless transceiver may additionally or alternatively be used to implement the interface 302.

In the example illustrated in FIG. 3, the controller 304 manages subscriptions and policies (e.g., global block list, device specific block list, device specific allow list, and the lightweight machine learning model) for the connectivity environment 104. For example, in the event the model generator 106 determines telemetry data is malicious during off-path classification, the controller 304 may block future flows of similar telemetry data. The example controller 304 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In the example illustrated in FIG. 3, the first data store 306 is configured to store the lightweight machine learning model from the model generator 106. The example first data store 306 of the illustrated example of FIG. 3 may be implemented by any device for storing data such as, for example, flash memory, magnetic media, optical media, etc. Furthermore, the data stored in the example first data store 306 may be in any data format such as, for example, binary data, comma delimited data, tab delimited data, structured query language (SQL) structures, etc.

In the example illustrated in FIG. 3, the second data store 308 is configured to store the global block list, the device specific allow list, and the device specific block list from the model generator 106. The example second data store 308 of the illustrated example of FIG. 3 may be implemented by any device for storing data such as, for example, flash memory, magnetic media, optical media, etc. Furthermore, the data stored in the example second data store 308 may be in any data format such as, for example, binary data, comma delimited data, tab delimited data, structured query language (SQL) structures, etc.

FIG. 4 is an illustration of example pseudocode 400 for a first example device specific allow list. For example, the pseudocode 400 may correspond to an example device specific allow list generated by the model generator 106. Further in such an example, the device specific allow list illustrated by the pseudocode 400 may correspond to an AMAZON ECHO™ device.

In FIG. 4, the rules generator 206 determines that the cipher suite illustrated as TLS_ECDHE_ECDSA_WITH_AES_256_GCM_SHA384 is indicative of a benign flow and not a malicious flow. Similarly, the rules generator 206 determines that the Subject Alt Names (SAN) list lengths 24, 5 and 6 are indicative of a benign flow and not a malicious flow. Similarly, the rules generator 206 determines that the root cert list illustrated (e.g., cert_list) indicates benign cert lists that are indicative of a benign flow and not a malicious flow.

Figure 5:
FIG. 5 is an illustration of example pseudocode for a second example device specific allow list.

FIG. 5 is an illustration of example pseudocode 500 for a second example device specific allow list. For example, the pseudocode 500 may correspond to an example device specific allow list generated by the model generator 106. Further in such an example, the device specific allow list illustrated by the pseudocode 600 may correspond to a GOOGLE HOME™ device.

In FIG. 5, the rules generator 206 determines that the encryption algorithms TLS_CHACHA20_POLY1305_SHA256, TLS_AES_128_GCM_SHA256 and TLS_AES_256_GCM_SHA384 are indicative of benign flows and not malicious flows. As another example, the rules generator 206 determines that public key lengths of 32, the signature algorithm "intrinsic," and the selected cipher suite TLS_CHACHA20_POLY1305_SHA256 are indicative of benign flows and not malicious flows.

FIG. 6 is an illustration of example pseudocode 600 for a first example device specific block list. For example, the pseudocode 600 may correspond to an example device specific block list generated by the model generator 106. Further in such an example, the device specific block list illustrated by the pseudocode 600 may correspond to an AMAZON ECHO™ device.

In FIG. 6, the rules generator 206 determines that a Subject Alt Names (SAN) list length of 3, 99, 4, 8 and 56 is indicative of malicious flows. As another example, the rules generator 206 determines that cipher suites such as "TLS_RSA_WITH_AES_128_CBC_SHA256", "TLS_ECDHE_ECDSA_WITH_AES_128_GCM_SHA256", "TLS_RSA_WITH_AES_256_CBC_SHA", "TLS_ECDHE_RSA_WITH_AES_128_CBC_SHA256" are indicative of malicious flows.

FIG. 7 is an illustration of example pseudocode 700 for a second example device specific block list. For example, the pseudocode 700 may correspond to an example device specific block list generated by the model generator 106. Further in such an example, the device specific block list illustrated by the pseudocode 700 may correspond to a GOOGLE HOME™ device.

In FIG. 7, the rules generator 206 determines that telemetry data using self-signed certificates are indicative of malicious activity. As another example, the rules generator 206 determines that extension types such as "heartbeat" and "encrypt the mac" are indicative of malicious flows.

Figure 8:
FIG. 8 is an illustration of example pseudocode for a global block list.

FIG. 8 is an illustration of example pseudocode 800 for a global block list. For example, the pseudocode 800 may correspond to an example global block list generated by the model generator 106. Further in such an example, the global block list illustrated by the pseudocode 800 is a device agnostic block list and may correspond to any suitable network device.

In FIG. 8, the rules generator 206 determines that that selected cipher suite values of "TLS_ECDHE_RSA_WITH_AES_128_CBC_SHA", "TLS_ECDHE_RSA_WITH_AES_256 CBC_SHA", "TLS_RSA_WITH_AES_128 CBC_SHA256", "TLS_RSA_WITH_AES_128 CBC_SHA", "TLS_ECDHE_RSA_WITH_AES_128 CBC_SHA256", "TLS_ECDHE_RSA_WITH_AES_256 CBC_SHA384" are indicative of malicious activity. As another example, the rules generator 206 determines that telemetry data using RSA as a public key algorithm is indicative of malicious activity.

Figure 9:
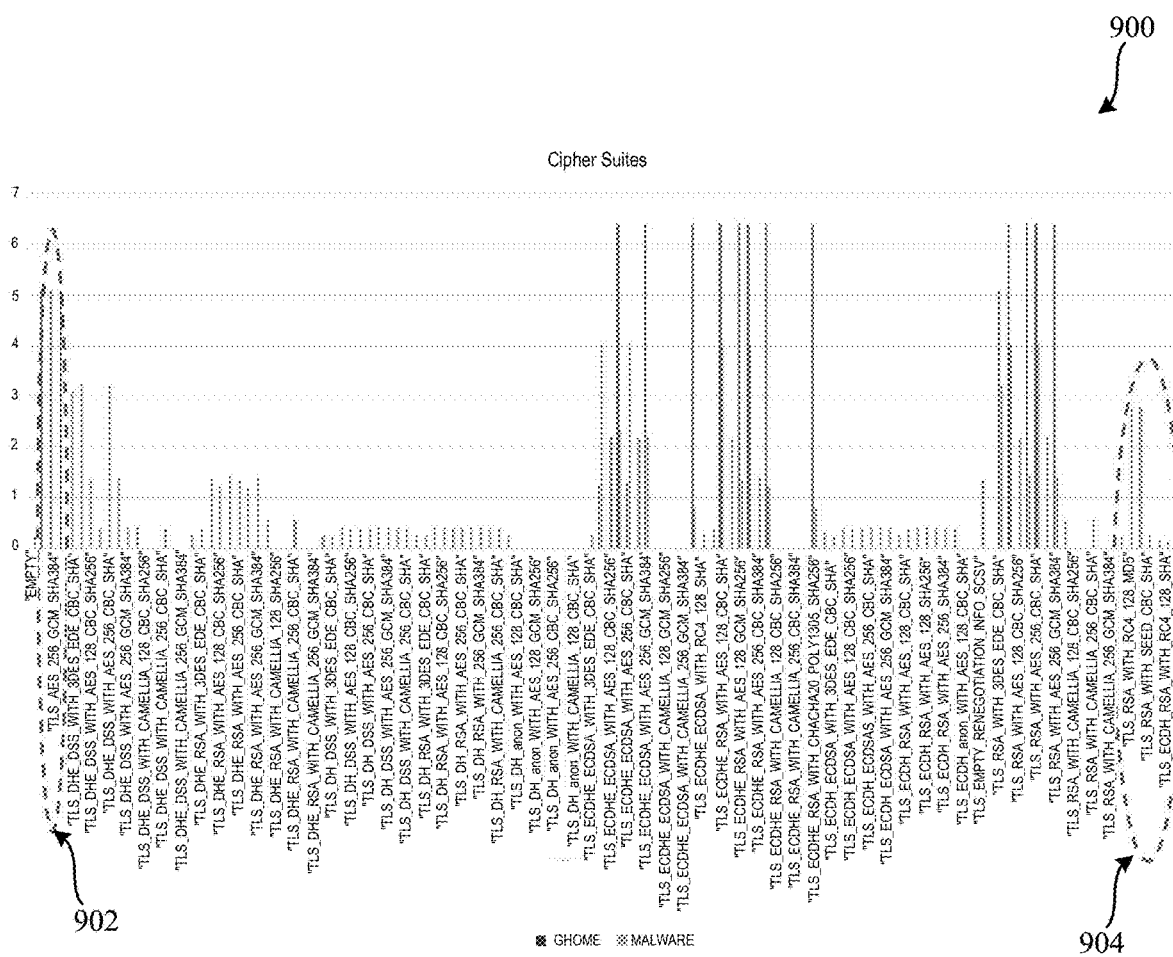
FIG. 9 is an example graphical illustration illustrating benign and malicious cipher suites.

FIG. 9 is an example graphical illustration 900 illustrating benign and malicious cipher suites. In FIG. 9, example first cipher suites 902 observed by the rules generator 206 occur often and are associated with malicious activity. Accordingly, the rules generator 206 may include such first cipher suites 902 in a device specific block list. In another example, example second cipher suites 904 observed by the rules generator 206 occur often and are associated with benign activity. Accordingly, the rules generator 206 may include such second cipher suites 904 in a device specific allow list.

Figure 10:
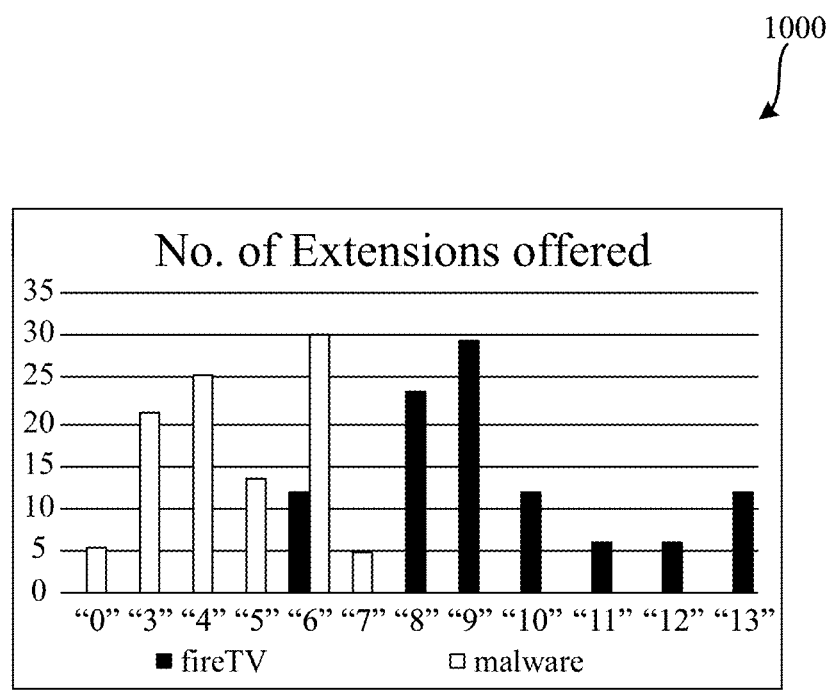
FIG. 10 is an example graphical illustration illustrating various quantities of extensions that are benign or malicious.

FIG. 10 is an example graphical illustration 1000 illustrating various quantities of extensions that are benign or malicious. In FIG. 10, telemetry data including zero, three, four, five, and/or seven extensions is likely indicative of malicious activity. Similarly, telemetry data including eight, nine, ten, eleven, twelve, and/or thirteen extensions is likely indicative of benign activity.

Figure 11:
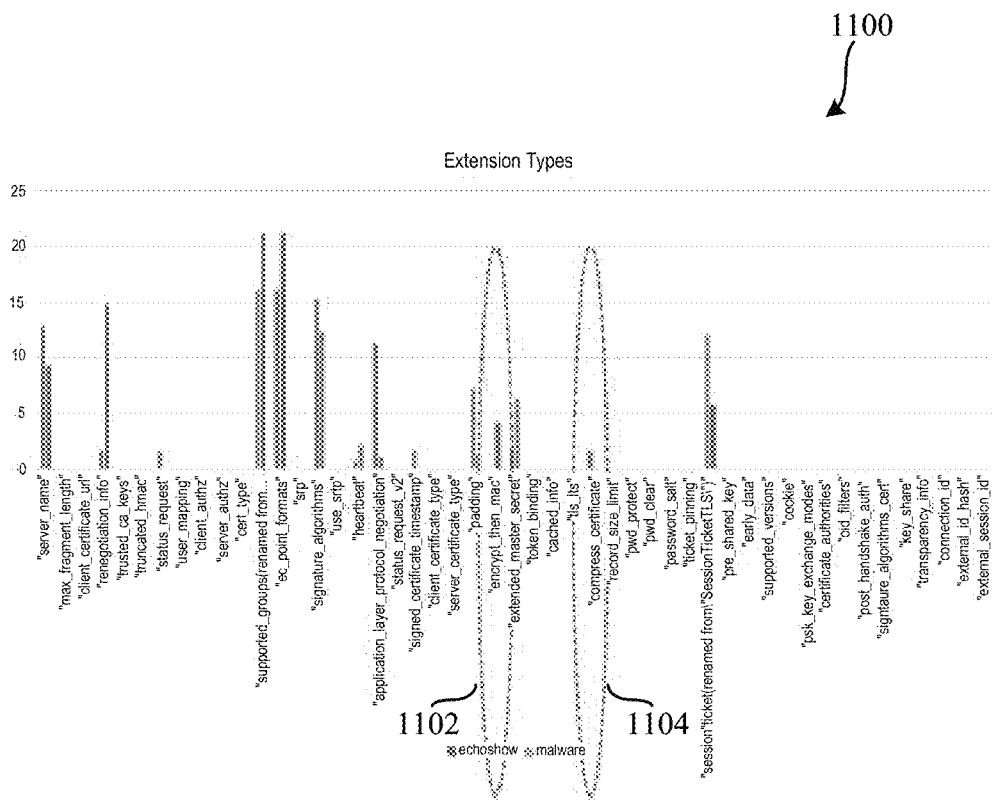
FIG. 11 is an example graphical illustration illustrating benign and malicious extension types.

FIG. 11 is an example graphical illustration 1100 illustrating benign and malicious extension types. In FIG. 11, example first extension types 1102 observed by the rules generator 206 occur often and are associated with malicious activity. Accordingly, the rules generator 206 may include such first extension types 1102 in a device specific block list. In another example, example second cipher suites 1104 observed by the rules generator 206 occur often and are associated with benign activity. Accordingly, the rules generator 206 may include such second cipher suites 1104 in a device specific allow list.

Figure 12:
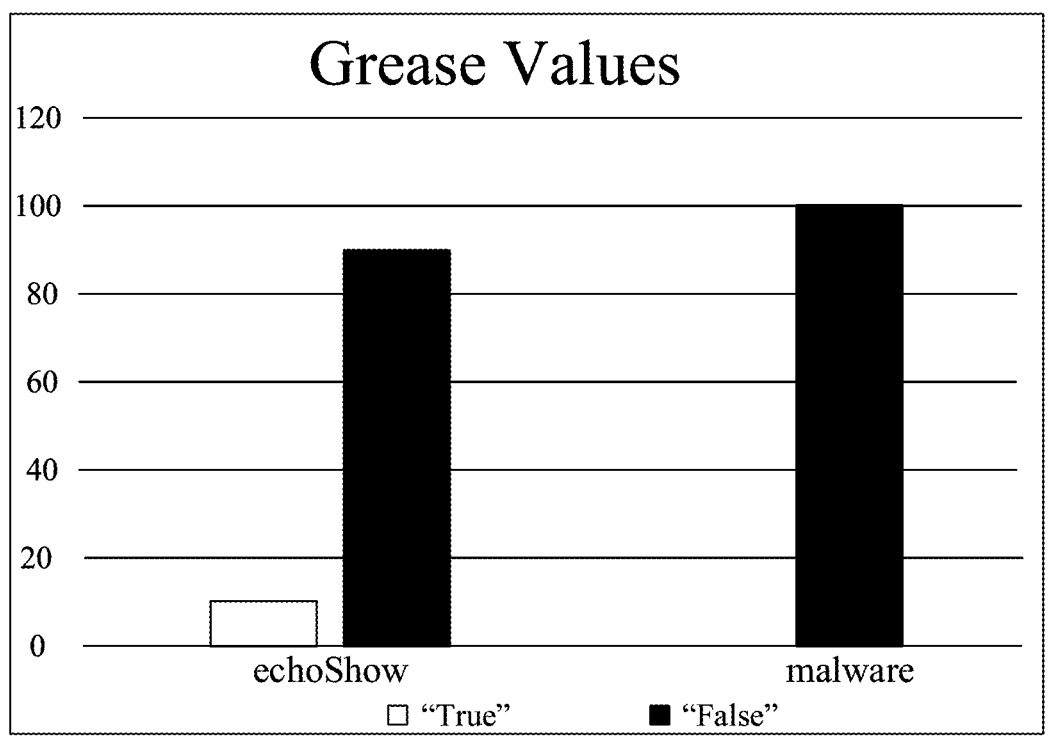
FIG. 12 is an example graphical illustration illustrating the usage of an example grease extension across benign and malicious flows.
Figure 13:
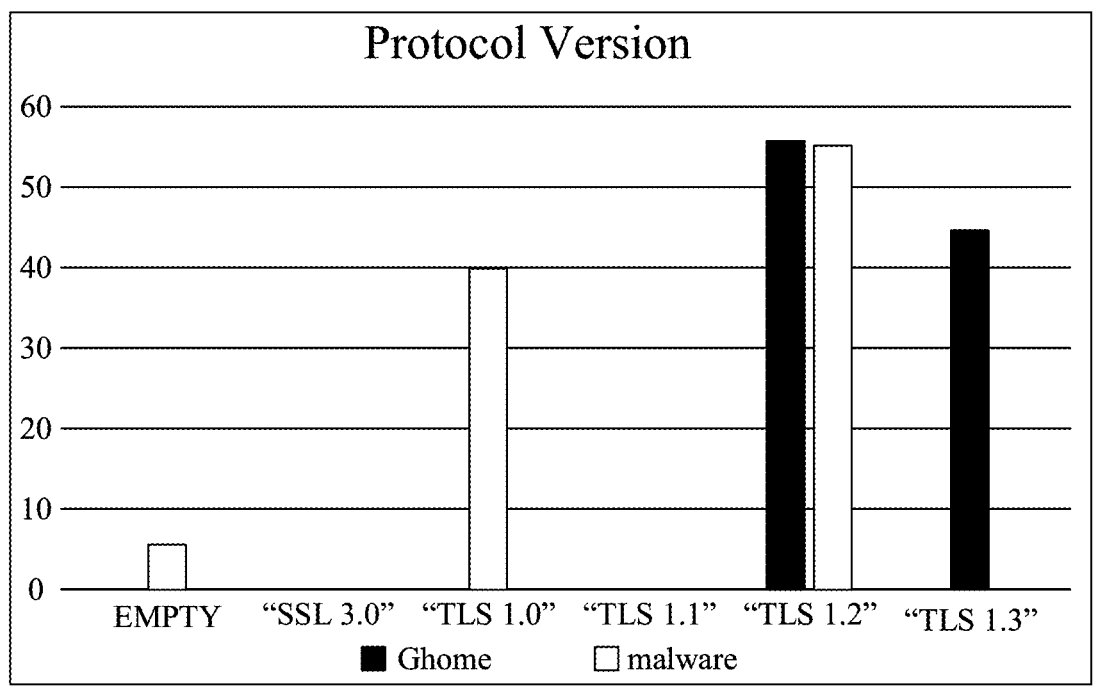
FIG. 13 is an example graphical illustration illustrating example security protocol versions utilized in benign and malicious flows.

FIG. 12 is an example graphical illustration 1200 illustrating the usage of an example grease extension across benign and malicious flows. FIG. 13 is an example graphical illustration 1300 illustrating example security protocol versions utilized in benign and malicious flows.

While an example manner of implementing the network 102 and/or the gateway 110 of FIG. 1 is illustrated in FIGS. 1, 2, and/or 3, one or more of the elements, processes and/or devices illustrated in FIGS. 1, 2, and/or 3 may be combined, divided, re-arranged, omitted, eliminated and/or implemented in any other way. Further, the example interface 202, the example telemetry collector 204, the example rules generator 206, the example model trainer 208, the example data store 210, and/or, more generally, the example model generator 106 of FIGS. 1 and/or 2, the example interface 302, the example controller 304, the example first data store 306, the example second data store 308, and/or, more generally, the example model manager 108 of FIGS. 1 and/or 3, the example model generator 106, the example model manager 108, and/or, more generally the example network 102 of FIG. 1, and/or the example gateway controller 122, the example inspection engine 124, the example policy manager 126, the example flow inspector 128, the example rules engine 130, the example model store 132, the example lightweight machine learning model 138, and/or, more generally, the example gateway 110 of FIG. 1 may be implemented by hardware, software, firmware and/or any combination of hardware, software and/or firmware. Thus, for example, any of the example interface 202, the example telemetry collector 204, the example rules generator 206, the example model trainer 208, the example data store 210, and/or, more generally, the example model generator 106 of FIGS. 1 and/or 2, the example interface 302, the example controller 304, the example first data store 306, the example second data store 308, and/or, more generally, the example model manager 108 of FIGS. 1 and/or 3, the example model generator 106, the example model manager 108, and/or, more generally the example network 102 of FIG. 1, and/or the example gateway controller 122, the example inspection engine 124, the example policy manager 126, the example flow inspector 128, the example rules engine 130, the example model store 132, the example lightweight machine learning model 138, and/or, more generally, the example gateway 110 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 202, the example telemetry collector 204, the example rules generator 206, the example model trainer 208, the example data store 210, and/or, more generally, the example model generator 106 of FIGS. 1 and/or 2, the example interface 302, the example controller 304, the example first data store 306, the example second data store 308, and/or, more generally, the example model manager 108 of FIGS. 1 and/or 3, the example model generator 106, the example model manager 108, and/or, more generally the example network 102 of FIG. 1, and/or the example gateway controller 122, the example inspection engine 124, the example policy manager 126, the example flow inspector 128, the example rules engine 130, the example model store 132, the example lightweight machine learning model 138, and/or, more generally, the example gateway 110 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example network 102 and/or the example gateway 110 of FIG. 1 may include one or more elements, processes and/or devices in addition to, or instead of, those illustrated in FIGS. 1, 2, and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 14:
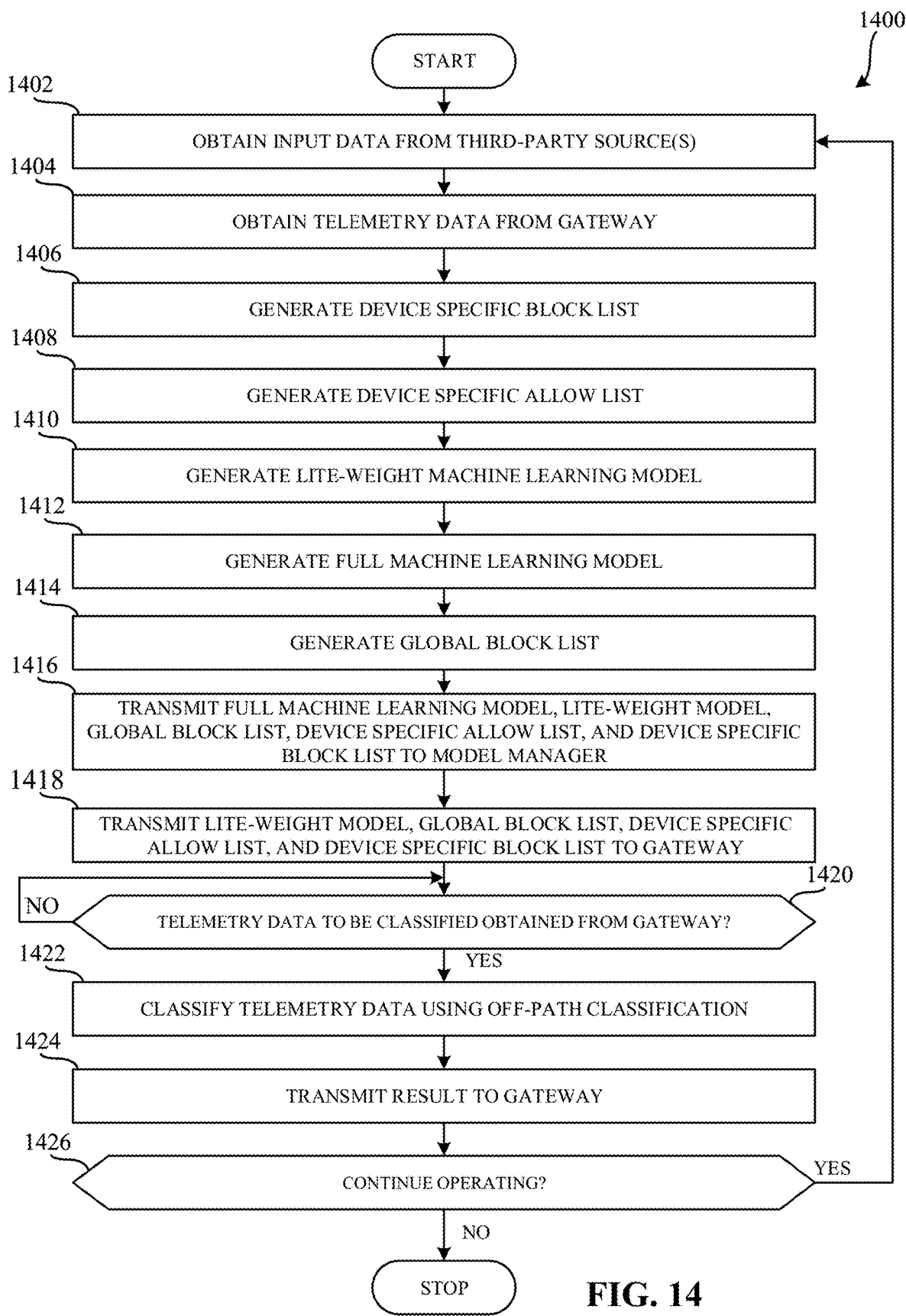
FIG. 14 is a flowchart representative of example machine readable instructions that may be executed by a processor to implement the example network of FIGS. 1, 2, and/or 3 to process telemetry data.
Figure 15:
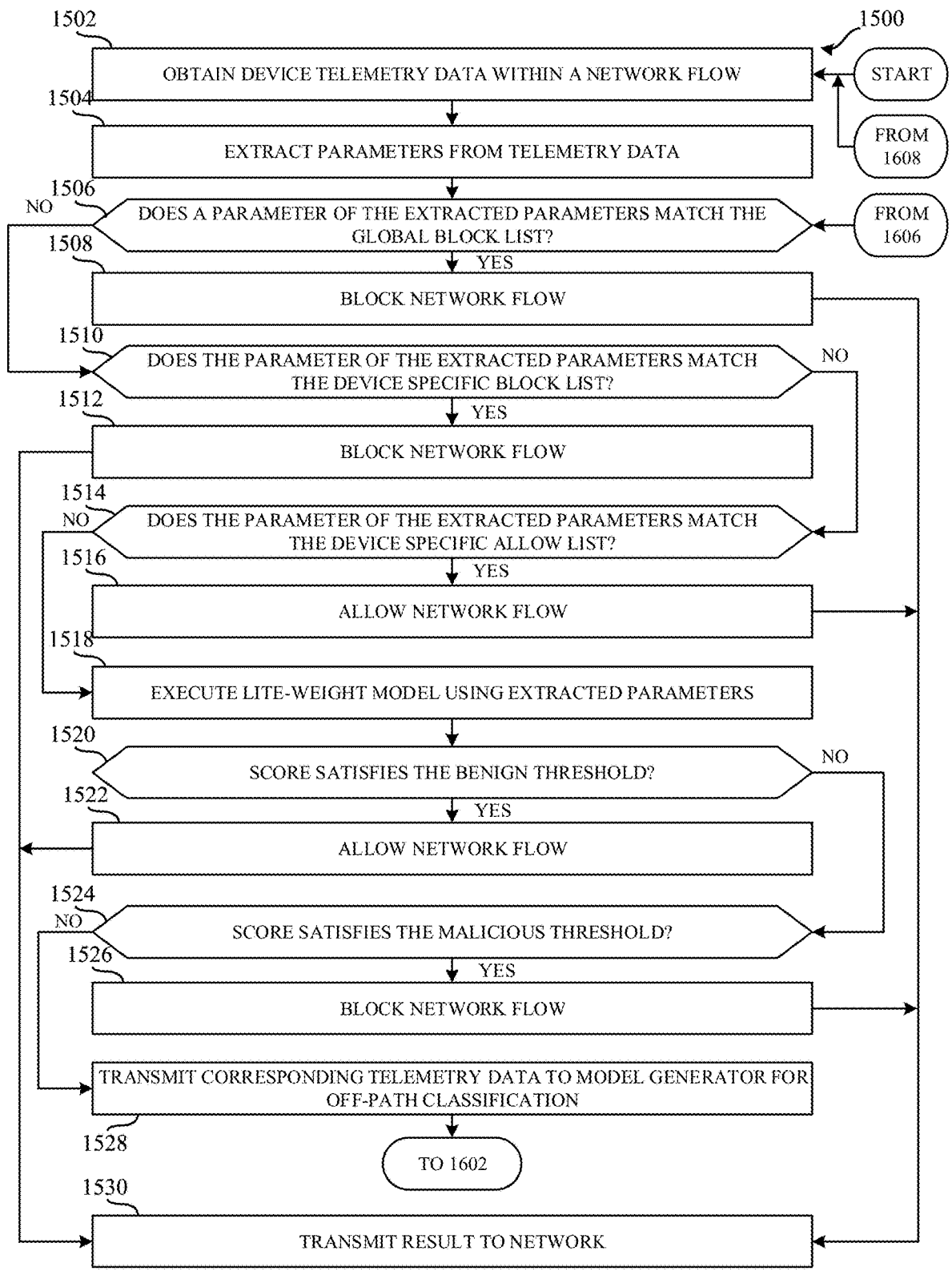
FIG. 15 is a flowchart representative of example machine readable instructions that may be executed by a processor to implement the example gateway of FIG. 1 to classify telemetry data.

Flowcharts representative of example hardware logic, machine readable instructions, hardware implemented state machines, and/or any combination thereof for implementing the network 102 and/or the gateway 110 of FIGS. 1, 2, and/or 3 are shown in FIGS. 14, 15, and/or 16. The machine readable instructions may be one or more executable programs or portion(s) of an executable program for execution by a computer processor and/or processor circuitry, such as the processor 1712, 1812 shown in the example processor platform 1700, 1800 discussed below in connection with FIGS. 17 and 18. The program may be embodied in software stored on a non-transitory computer readable storage medium such as a CD-ROM, a floppy disk, a hard drive, a DVD, a Blu-ray disk, or a memory associated with the processor 1712, 1812, but the entire program and/or parts thereof could alternatively be executed by a device other than the processor 1712, 1812 and/or embodied in firmware or dedicated hardware. Further, although the example program is described with reference to the flowcharts illustrated in FIGS. 14, 15, and 16, many other methods of implementing the example network 102 and/or the gateway 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 14, 15, and/or 16 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 14 is a flowchart representative of example machine readable instructions 1400 that may be executed by a processor to implement the example network 102 of FIGS. 1, 2, and/or 3 to process telemetry data.

At block 1402, the example interface 202 (FIG. 2) is configured to obtain third-party telemetry data from a third-party source. (Block 1402). For example, the interface 202 may obtain the example third-party telemetry data 136 from McAfee® Advance Threat Detection (ATD) team, VirusTotal, etc. In addition, the interface 202 is configured to obtain telemetry data from a gateway associated with network devices hosted by the gateway. (Block 1404). For example, the interface 202 may obtain example telemetry data 134 from the gateway 110 of FIG. 1.

At block 1406, the example rules generator 206 (FIG. 2) is configure to, in response to obtaining the third-party telemetry data 136 and the telemetry data 134, generate a device specific block list. (Block 1406). For example, the rules generator 206 may generate a device specific block list including various parameters of telemetry data known to be malicious when present in telemetry data for a specific network device. Additionally, the rules generator is configured to generate a device specific allow list. (Block 1408). For example, the rules generator 206 may generate a device specific allow list including various parameters of telemetry data known to be benign when present in telemetry data for a specific network device.

At block 1410, the example model trainer 208 (FIG. 2) is configured to generate a lightweight machine learning model. (Block 1410). For example, the lightweight machine learning model may be a network device specific lightweight machine learning model. Additionally, the example model trainer 208 is configured to generate a full machine learning model. (Block 1412). For example, to execute the control illustrated in block 1410 and/or 1412, the model trainer 208 may utilize the third-party telemetry data 136 and/or the telemetry data 134 to generate and/or otherwise train the machine learning models.

In response, the example rules generator 206 is configured to generate an example global block list using the lightweight machine learning model generated by the model trainer 208. (Block 1414).

At block 1416, the example interface 202 transmits the full neural network model, the lightweight machine learning model, global block list, device specific allow list, and device specific block list to the model manager 108 to facilitate off-path classification. (Block 1416). Additionally, the interface 202 transmits the lightweight machine learning model, global block list, device specific allow list, and device specific block list to the gateway 110 to facilitate on-path classification. (Block 1418).

In this manner, the interface 202 determines whether telemetry data to be classified is obtained from the gateway 110. (Block 1420). For example, the interface 202 may obtain telemetry data to be classified from the gateway 110 in the event the gateway 110 was unsuccessful in performing on-path classification. Accordingly, in the event telemetry data to be classified is not obtained (e.g., the control of block 1420 returns a result of NO), the interface 202 continues to wait. Alternatively, in the event telemetry data to be classified is obtained (e.g., the control of block 1420 returns a result of YES), the model trainer 208 performs off-path classification. (Block 1422). That is, in the event the gateway 110 of FIG. 1 is unable to classify telemetry data as benign or malicious (e.g., neither the benign nor the malicious thresholds are satisfied), the model trainer 208 performs off-path classification using the full neural network model. As an example, the model trainer 208 utilizes the full neural network model as an anomaly detection tool based on a reconstruction error. In examples disclosed herein, the model trainer 208 uses a reconstruction error (RE) based threshold to find determine whether incoming telemetry data is malicious or benign.

In response to obtaining a result from the off-path classification, the interface 202 transmits the result to the gateway 110. (Block 1424).

At block 1426, the network 102 determines whether to continue operating. (Block 1426). In the event the network 102 determines to continue operating (e.g., the control of block 1426 returns a result of YES), the process returns to block 1402. In examples disclosed herein, the network 102 may determine to continue operating in the event additional telemetry data (e.g., third-party telemetry data 136 and/or telemetry data 134) is available, etc. Alternatively, in the event the network 102 determines not to continue operating (e.g., the control of block 1426 returns a result of NO), the process stops.

FIG. 15 is a flowchart representative of example machine readable instructions 1500 that may be executed by a processor to implement the example gateway 110 of FIG. 1 to classify telemetry data.

At block 1502, the example flow inspector 128 obtain example telemetry data and/or parameters within a network flow. (Block 1502). For example, the flow inspector 128 may obtain example telemetry data and/or parameters within a network flow transmitted by any of the network devices 112, 114, 116, 118, 120. In response, the flow inspector 128 extracts the telemetry parameters from the network flow. (Block 1504). For example, the flow inspector 128 may extract TLS telemetry parameters from the network flow.

At block 1506, the rules engine 130 determines whether a parameter of the telemetry data matches a parameter in the global block list. (Block 1506). In the event the rules engine 130 determines that a parameter of the telemetry data matches a parameter in the global block list (e.g., the control of block 1506 returns a result of YES), the policy manager 126 blocks the corresponding network flow. (Block 1508).

Alternatively, in the event the rules engine 130 determines that a parameter of the telemetry data does not match a parameter in the global block list (e.g., the control of block 1506 returns a result of NO), the rules engine 130 determines whether a parameter of the telemetry data matches a parameter in the device specific block list. (Block 1510). In the event the rules engine 130 determines that a parameter of the telemetry data matches a parameter in the device specific block list (e.g., the control of block 1510 returns a result of YES), the policy manager 126 blocks the corresponding network flow. (Block 1512).

Alternatively, in the event the rules engine 130 determines that a parameter of the telemetry data does not match a parameter in the device specific block list (e.g., the control of block 1510 returns a result of NO), the rules engine 130 determines whether a parameter of the telemetry data matches a parameter in the device specific allow list. (Block 1514). In the event the rules engine 130 determines that a parameter of the telemetry data matches the device specific allow list (e.g., the control of block 1514 returns a result of NO), the policy manager 126 allows the corresponding network flow. (Block 1516).

In the event the rules engine 130 determines that a parameter of the telemetry data does not match a parameter in the device specific allow list (e.g., the control of block 1514 returns a result of NO), then the rules engine 130 executes the lightweight machine learning model 138 using the parameters in the telemetry data. (Block 1518). As a result, the rules engine 130 obtains a probability score ranging from 0 to 1, where 0 indicates a benign flow and 1 indicates a malicious flow. Examples disclosed herein include an example benign threshold and an example malicious threshold.

In response to obtaining the result, the rules engine 130 determines whether the probability score satisfies the benign threshold. (Block 1520). For example, the probability score may satisfy the benign threshold when the probability score is below a benign threshold value (e.g., below 0.2, etc.). In the event the rules engine 130 determines the probability score satisfies the benign threshold (e.g., the control of block 1520 returns a result of YES), the policy manager 126 allows the corresponding network flow. (Block 1522).

Alternatively, in the event the rules engine 130 determines the probability score does not satisfy the benign threshold (e.g., the control of block 1520 returns a result of NO), the rules engine 130 then determines whether the probability score satisfies the malicious threshold. (Block 1524). For example, the probability score may satisfy the malicious threshold when the probability score is above a malicious threshold value (e.g., above 0.75, etc.). In the event the rules engine 130 determines the probability score satisfies the malicious threshold (e.g., the control of block 1524 returns a result of YES), the policy manager 126 blocks the corresponding network flow. (Block 1526).

In the event the rules engine 130 determines the probability score does not satisfy the malicious threshold (e.g., the control of block 1524 returns a result of NO), then the gateway controller 122 transmits the corresponding telemetry data to the model generator 106 to perform off-path classification. (Block 1528). In some examples disclosed herein, the policy manager 126 transmits the corresponding telemetry data to the model generator 106 to perform off-path classification. In response to the control illustrated in block 1528, the process proceeds to block 1602 of FIG. 16. Description of FIG. 16 is provided below.

Additionally, in the example of FIG. 15, in response to a successful classification (e.g., in response to the execution of the control illustrated in blocks 1508, 1512, 1516, 1522, and/or 1526), the gateway controller 122 transmits the result (e.g., the classification result) to the network 102. (Block 1530). In some examples disclosed herein, control proceeds back to block 1502 responsive to the execution of the instructions represented by block 1530.

Figure 16:
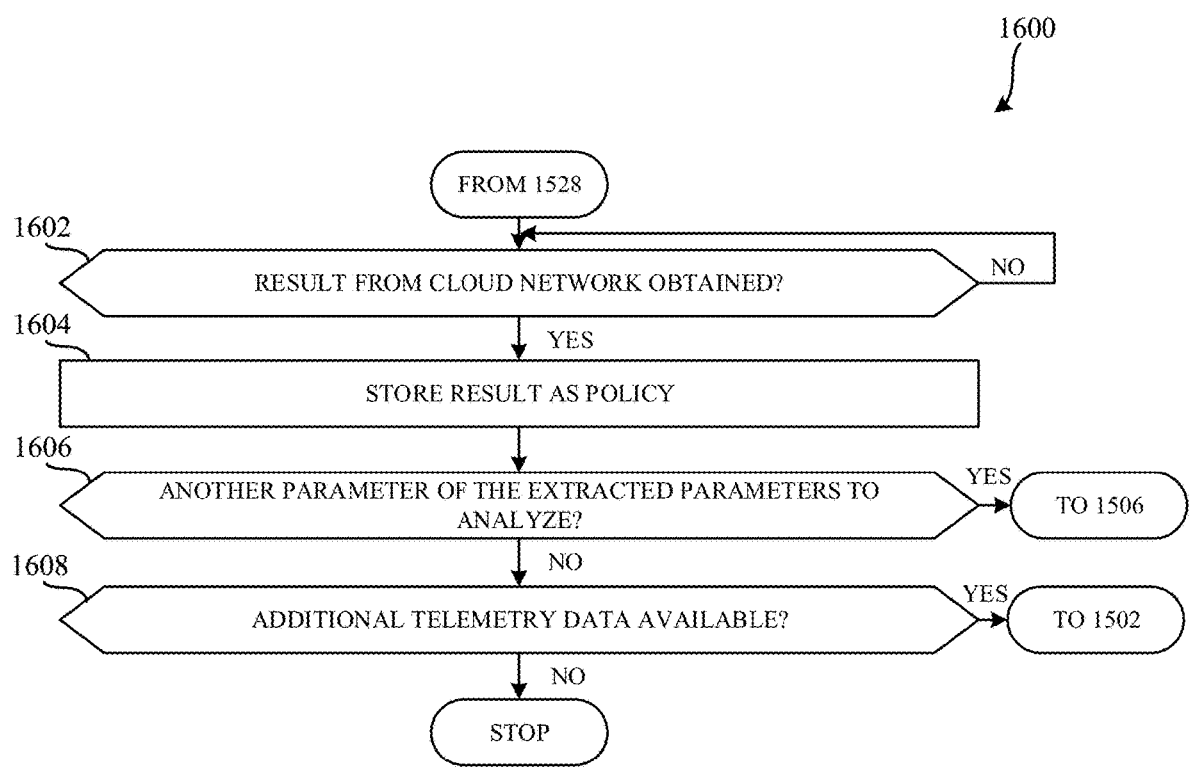
FIG. 16 is a flowchart representative of example machine readable instructions that may be executed by a processor to implement the example gateway of FIG. 1 to classify telemetry data.

FIG. 16 is a flowchart representative of example machine readable instructions 1600 that may be executed by a processor to implement the example gateway 110 of FIG. 1 to classify telemetry data.

At block 1602, the policy manager 126 determines whether a classification result from the network 102 is obtained. (Block 1602). For example, in the event off-path classification is initiated, the policy manager 126 may wait to obtain a classification result from the network 102. In the event the policy manager 126 determines that a classification result is not obtained (e.g., the control of block 1602 returns a result of NO), the process waits.

Alternatively, in the event the policy manager 126 determines the result from the network is obtained (e.g., the control of block 1602 returns a result of YES), the policy manager 126 stores and/or otherwise updates the result as a policy. (Block 1604).

At block 1606, the rules engine 130 determines whether there is another parameter of the obtained telemetry data to analyze. (Block 1606). In the event the rules engine 130 determines there is another parameter of the obtained telemetry data to analyze (e.g., the control of block 1606 returns a result of YES), the process returns to block 1506. Alternatively, in the event the rules engine 130 determines there is not another parameter of the obtained telemetry data to analyze (e.g., the control of block 1606 returns a result of NO), the flow inspector 128 determines whether there is additional telemetry data available. (Block 1608). In the event the flow inspector 128 determines there is additional telemetry data available (e.g., the control of block 1608 returns a result of YES), the process returns to block 1502. Alternatively, in the event the flow inspector 128 determines there is no additional telemetry data available (e.g., the control of block 1608 returns a result of NO), the process stops.

Figure 17:
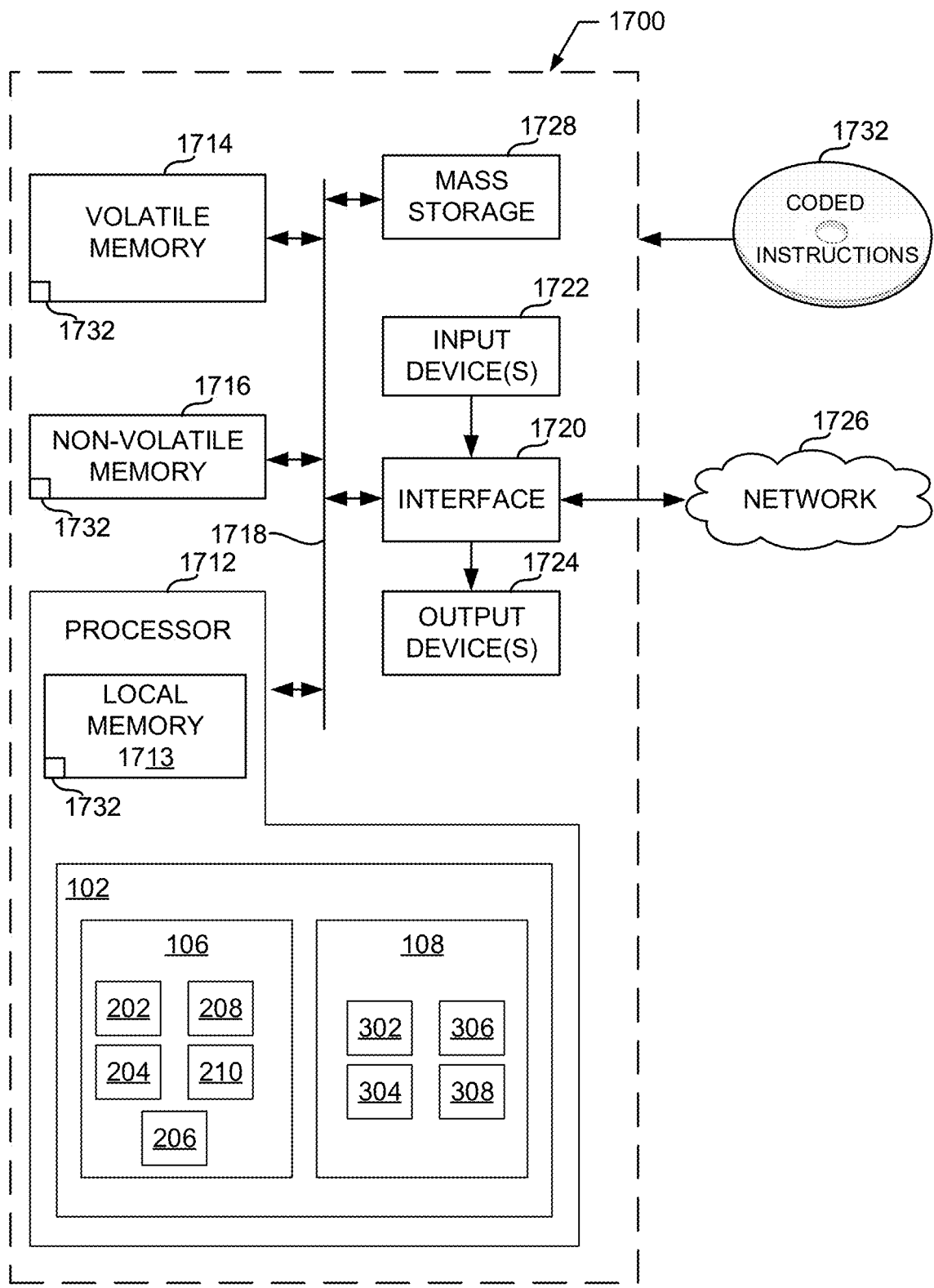
FIG. 17 is a block diagram of an example processor platform structured to execute the instructions of FIG. 14 to implement the example model generator and/or the example model manager of the example network of FIGS. 1, 2, and/or 3.

FIG. 17 is a block diagram of an example processor platform 1700 structured to execute the instructions of FIG. 14 to implement the example model generator 106 and/or the example model manager 108 of the example network 102 of FIGS. 1, 2, and/or 3. The processor platform 1700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example interface 202, the example telemetry collector 204, the example rules generator 206, the example model trainer 208, the example data store 210, and/or, more generally, the example model generator 106 of FIGS. 1 and/or 2, the example interface 302, the example controller 304, the example first data store 306, the example second data store 308, and/or, more generally, the example model manager 108 of FIGS. 1 and/or 3, the example model generator 106, the example model manager 108, and/or, more generally the example network 102 of FIG. 1.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives.

The machine executable instructions 1732 of FIG. 14 may be stored in the mass storage device 1728, in the volatile memory 1714, in the non-volatile memory 1716, and/or on a removable non-transitory computer readable storage medium such as a CD or DVD.

Figure 18:
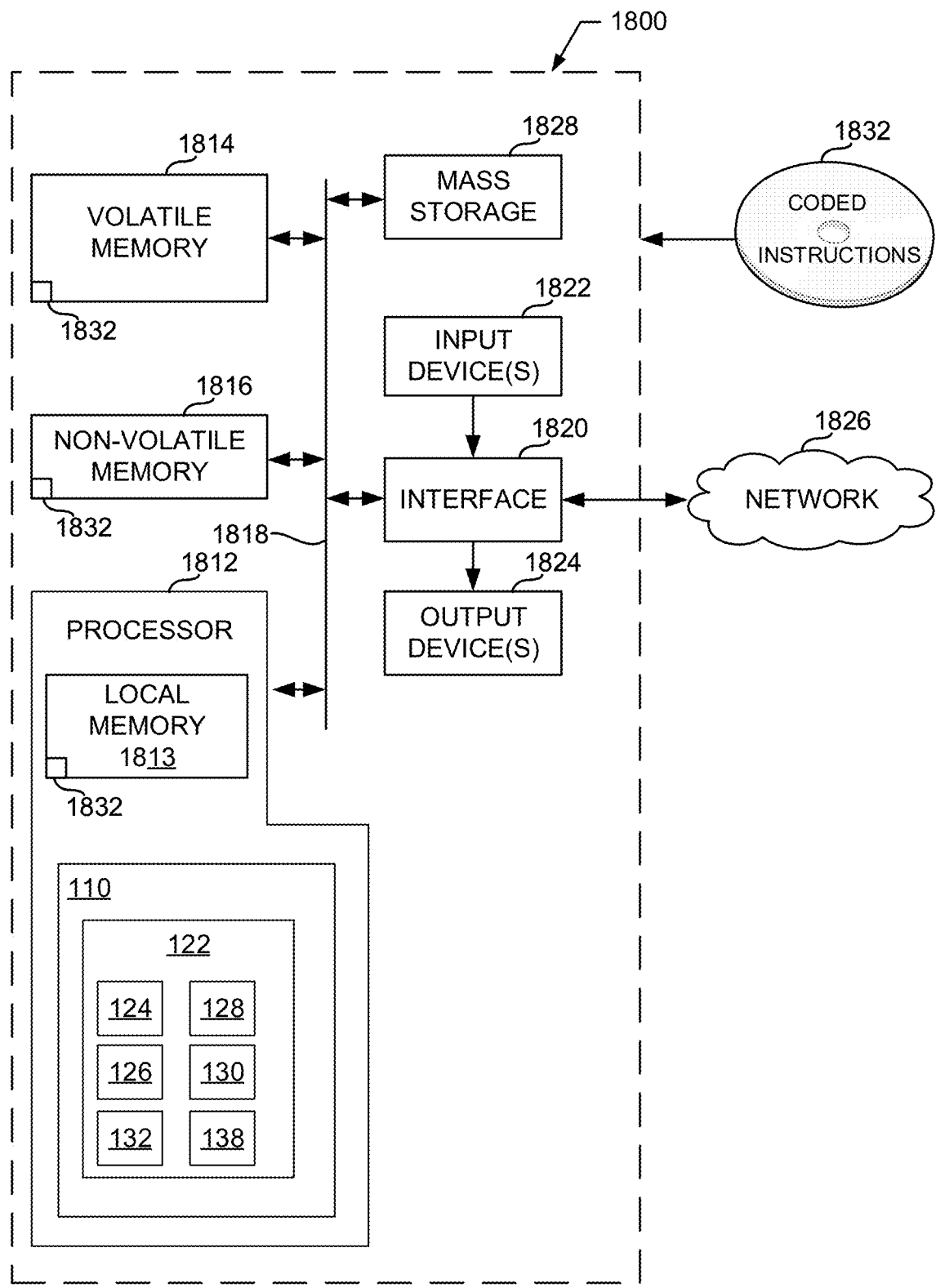
FIG. 18 is a block diagram of an example processor platform structured to execute the instructions of FIGS. 15 and/or 16 to implement the gateway of FIG. 1.

FIG. 18 is a block diagram of an example processor platform 1800 structured to execute the instructions of FIGS. 15 and/or 16 to implement the gateway 110 of FIG. 1. The processor platform 1800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example gateway controller 122, the example inspection engine 124, the example policy manager 126, the example flow inspector 128, the example rules engine 130, the example model store 132, the example lightweight machine learning model 138, and/or, more generally, the example gateway 110 of FIG. 1.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), a Bluetooth® interface, a near field communication (NFC) interface, and/or a PCI express interface.

In the illustrated example, one or more input devices 1822 are connected to the interface circuit 1820. The input device(s) 1822 permit(s) a user to enter data and/or commands into the processor 1812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1820 of the illustrated example, thus, typically includes a graphics driver card, a graphics driver chip and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, redundant array of independent disks (RAID) systems, and digital versatile disk (DVD) drives.

The machine executable instructions 1832 of FIGS. 15 and/or 16 may be stored in the mass storage device 1828, in the volatile memory 1814, in the non-volatile memory 1816, and/or on a removable non-transitory computer readable storage medium such as a CD or DVD.

Figure 19:
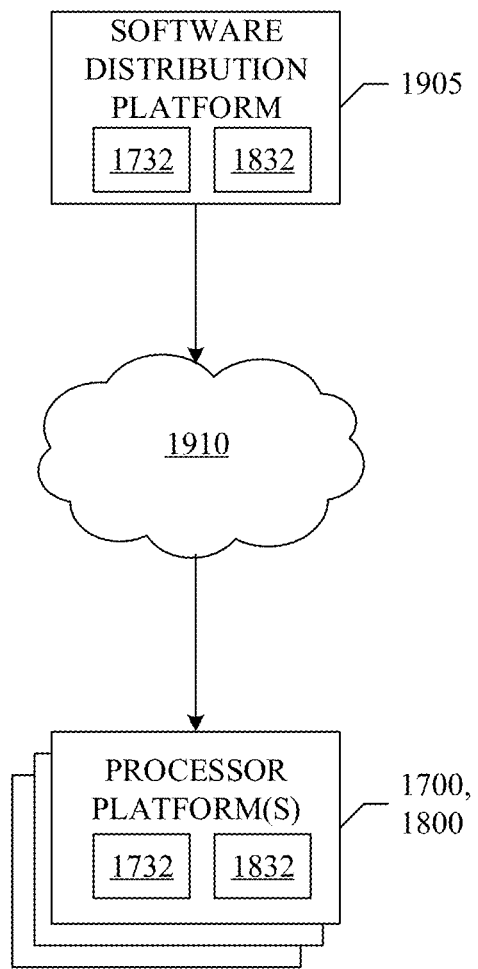
FIG. 19 is a block diagram of an example software distribution platform to distribute software (e.g., software corresponding to the example computer readable instructions of FIGS. 14, 15, and/or 16) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1905 to distribute software such as the example computer readable instructions 1732, 1832 of FIGS. 17 and/or 18 to third parties is illustrated in FIG. 19. The example software distribution platform 1905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1732, 1832 of FIGS. 17 and/or 18. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the computer readable instructions 1732, 1832, which may correspond to the example computer readable instructions 1400, 1500, 1600 of FIGS. 14, 15, and/or 16, as described above. The one or more servers of the example software distribution platform 1905 are in communication with a network 1910, which may correspond to any one or more of the Internet and/or any of the example networks 102 described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1732, 1832 from the software distribution platform 1905. For example, the software, which may correspond to the example computer readable instructions 1400, 1500, 1600 of FIGS. 14, 15, and/or 16, may be downloaded to the example processor platform 1700, 1800, which is to execute the computer readable instructions 1732, 1832 to implement the network 102 and/or the gateway 110. In some examples, one or more servers of the software distribution platform 1905 periodically offer, transmit, and/or force updates to the software (e.g., the example computer readable instructions 1732, 1832 of FIGS. 17 and/or 18) to ensure improvements, patches, updates, etc. are distributed and applied to the software at the end user devices.

From the foregoing, it will be appreciated that example methods, apparatus and articles of manufacture have been disclosed that utilize (a) a global block list of rules, (b) a device specific block list of rules, and (c) a device specific allow list of rules to generate and/or otherwise train a lightweight machine learning model and a full machine learning model. In examples disclosed herein, the lightweight machine learning model, (a) the global block list of rules, (b) the device specific block list of rules, and (c) the device specific allow list of rules are transmitted to a gateway to perform on-path detection. In the event on-path detection of telemetry data is unsuccessful at the gateway, the telemetry data is transmitted back to the cloud network for off-path processing (e.g., performing off-path detection). On-path detection may be unsuccessful if, for example, the telemetry data cannot be classified using the lightweight machine learning model, (a) the global block list of rules, (b) the device specific block list of rules, and (c) the device specific allow list of rules. In this manner, the full neural network model is not stored at the gateway, thus conserving memory utilization in the gateway. Similarly, the cloud network generates the full machine learning model, the lightweight machine learning model, (a) the global block list of rules, (b) the device specific block list of rules, and (c) the device specific allow list of rules, for network devices present in a connectivity environment. Thus, conserving memory utilization in both the gateway and the cloud network. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to analyze telemetry data of a network device for malicious activity are disclosed herein. Further examples and combinations thereof include the following:

Example 1 includes an apparatus comprising an interface to obtain first telemetry data, a rules generator to, using the first telemetry data, generate a global block list using a machine learning model, the machine learning model generated based on a device specific block list and a device specific allow list, and a model manager to transmit the global block list to a gateway, the gateway to facilitate on-path classification of second telemetry data.

Example 2 includes the apparatus of example 1, wherein the machine learning model is a first machine learning model, wherein the rules generator is to generate a second machine learning model using the first machine learning model, the device specific allow list, and the device specific block list.

Example 3 includes the apparatus of example 2, wherein the first machine learning model is a light-weight machine learning model, and the second machine learning model is a full neural network model.

Example 4 includes the apparatus of example 2, wherein the interface is to obtain third telemetry data from the gateway, the third telemetry data obtained when the gateway is unsuccessful in performing on-path classification.

Example 5 includes the apparatus of example 4, further including a model trainer to use the second machine learning model to facilitate off-path classification of the third telemetry data.

Example 6 includes the apparatus of example 1, wherein the rules generator is to generate the device specific block list, the device specific block list including first parameters of the first telemetry data known to be malicious, generate the device specific allow list, the device specific allow list including second parameters of the first telemetry data known to be benign, and generate the machine learning model based on the device specific block list and the device specific allow list.

Example 7 includes the apparatus of example 1, wherein the model manager is to store the machine learning model, the global block list, the device specific allow list, and the device specific block list for use in performing off-path classification.

Example 8 includes a non-transitory computer readable storage medium comprising instructions which, when executed, cause at least one processor to at least obtain first telemetry data, generate a global block list using the machine learning model, the machine learning model based on a device specific block list and a device specific allow list, and transmit the global block list to a gateway, the gateway to facilitate on-path classification of second telemetry data.

Example 9 includes the non-transitory computer readable medium of example 8, wherein the machine learning model is a first machine learning model, wherein the instructions, when executed, cause the at least one processor to generate the device specific block list, the device specific block list including first parameters of the first telemetry data known to be malicious, generate the device specific allow list, the device specific allow list including second parameters of the first telemetry data known to be benign, generate the machine learning model based on the device specific block list and the device specific allow list, and generate a second machine learning model using the first machine learning model, the device specific allow list, and the device specific block list.

Example 10 includes the non-transitory computer readable medium of example 9, wherein the first machine learning model is a light-weight machine learning model, and the second machine learning model is a full neural network model.

Example 11 includes the non-transitory computer readable medium of example 9, wherein the instructions, when executed, cause the at least one processor to obtain third telemetry data from the gateway, the third telemetry data obtained when the gateway is unsuccessful in performing on-path classification.

Example 12 includes the non-transitory computer readable medium of example 11, wherein the instructions, when executed, cause the at least one processor to use the second machine learning model to facilitate off-path classification of the third telemetry data.

Example 13 includes the non-transitory computer readable medium of example 12, wherein the instructions, when executed, cause the at least one processor to transmit a result of the off-path classification to the gateway.

Example 14 includes the non-transitory computer readable medium of example 8, wherein the instructions, when executed, cause the at least one processor to store the machine learning model, the global block list, the device specific allow list, and the device specific block list for use in performing off-path classification.

Example 15 includes a method comprising obtaining first telemetry data, generating a global block list using a machine learning model, the machine learning model based on a device specific block list and a device specific allow list, and transmitting the global block list to a gateway, the gateway to facilitate on-path classification of second telemetry data.

Example 16 includes the method of example 15, wherein the machine learning model is a first machine learning model, the method further including generating a second machine learning model using the first machine learning model, the device specific allow list, and the device specific block list.

Example 17 includes the method of example 16, wherein the first machine learning model is a light-weight machine learning model, and the second machine learning model is a full neural network model.

Example 18 includes the method of example 16, further including obtaining third telemetry data from the gateway, the third telemetry data obtained when the gateway is unsuccessful in performing on-path classification.

Example 19 includes the method of example 18, further including using the second machine learning model to facilitate off-path classification of the third telemetry data.

Example 20 includes the method of example 19, further including generating the device specific block list, the device specific block list including first parameters of the first telemetry data known to be malicious, generating the device specific allow list, the device specific allow list including second parameters of the first telemetry data known to be benign, and generating the machine learning model based on the device specific block list and the device specific allow list.

Example 21 includes the method of example 15, further including storing the machine learning model, the global block list, the device specific allow list, and the device specific block list for use in performing off-path classification.

Example 22 includes a server to distribute first instructions on a network, the server comprising at least one storage device including second instructions, and at least one processor to execute the second instructions to transmit the first instructions over the network, the first instructions, when executed, to cause at least one device to obtain first telemetry data, generate a global block list using the machine learning model, the machine learning model based on a device specific block list and a device specific allow list, and transmit the global block list to a gateway, the gateway to facilitate on-path classification of second telemetry data.

Example 23 includes the server of example 22, wherein the machine learning model is a first machine learning model, wherein the first instructions, when executed, cause the at least one device to generate a second machine learning model using the first machine learning model, the device specific allow list, and the device specific block list.

Example 24 includes the server of example 23, wherein the first machine learning model is a light-weight machine learning model, and the second machine learning model is a full neural network model.

Example 25 includes the server of example 23, wherein the first instructions, when executed, cause the at least one device to obtain third telemetry data from the gateway, the third telemetry data obtained when the gateway is unsuccessful in performing on-path classification.

Example 26 includes the server of example 25, wherein the first instructions, when executed, cause the at least one device to use the second machine learning model to facilitate off-path classification of the third telemetry data.

Example 27 includes the server of example 26, wherein the first instructions, when executed, cause the at least one device to generate the device specific block list, the device specific block list including first parameters of the first telemetry data known to be malicious, generate the device specific allow list, the device specific allow list including second parameters of the first telemetry data known to be benign, and generate the machine learning model based on the device specific block list and the device specific allow list.

Example 28 includes the server of example 22, wherein the first instructions, when executed, cause the at least one device to store the machine learning model, the global block list, the device specific allow list, and the device specific block list for use in performing off-path classification.

Example 29 includes an apparatus comprising a flow inspector located in a gateway, the flow inspector configured to obtain telemetry data corresponding to a network flow of a network device, a rules engine configured to when a parameter in the telemetry data matches a global block list or a device specific block list, generate a first indication to block the network flow, and when the parameter in the telemetry data matches a device specific allow list, generate a second indication to allow the network flow, and a policy manager configured to block network flow in response to obtaining the first indication, and allow the network flow in response to obtaining the second indication.

Example 30 includes the apparatus of example 29, further including the rules engine to dynamically obtain the device specific block list and the device specific allow list from an external network based on the network device, and a model store configured to store a lightweight machine learning model, the lightweight machine learning model generated based on parameters obtained from the telemetry data corresponding to the network flow of the network device.

Example 31 includes the apparatus of example 30, wherein the rules engine is configured to execute the lightweight machine learning model using the parameter in the telemetry data to obtain a score.

Example 32 includes the apparatus of example 31, wherein the rules engine is configured to when the score satisfies a first threshold, generate a third indication to allow the network flow, and when the score satisfies a second threshold, generate a fourth indication to block the network flow.

Example 33 includes the apparatus of example 32, wherein the first threshold is satisfied when the score is below a first threshold value, wherein the second threshold is satisfied when the score is above a second threshold value, the first threshold value different from the second threshold value, and wherein the policy manager is configured to transmit the telemetry data to the external network to perform off-path classification when the first threshold value and the second threshold value are not satisfied.

Example 34 includes the apparatus of example 29, wherein the apparatus is configured to obtain a lightweight machine learning model from an external network, the external network further including a full neural network model.

Example 35 includes the apparatus of example 29, wherein the network device is an Internet of Things device, and wherein computer processing resources are conserved in the apparatus in response to storing the device specific allow list and the device specific block list.

Example 36 includes a non-transitory computer readable storage medium comprising instructions which, when executed, cause at least one processor to at least obtain telemetry data corresponding to a network flow of a network device, when a parameter in the telemetry data matches a global block list or a device specific block list, generate a first indication to block the network flow, when the parameter in the telemetry data matches a device specific allow list, generate a second indication to allow the network flow, block network flow in response to obtaining the first indication, and allow the network flow in response to obtaining the second indication.

Example 37 includes the non-transitory computer readable storage medium of example 36, wherein the instructions, when executed, cause the at least one processor to dynamically obtain the device specific block list and the device specific allow list from an external network based on the network device, and store a lightweight machine learning model, the lightweight machine learning model generated based on parameters obtained from the telemetry data corresponding to the network flow of the network device.

Example 38 includes the non-transitory computer readable storage medium of example 37, wherein the instructions, when executed, cause the at least one processor to execute the lightweight machine learning model using the parameter in the telemetry data to obtain a score.

Example 39 includes the non-transitory computer readable storage medium of example 38, wherein the instructions, when executed, cause the at least one processor to when the score satisfies a first threshold, generate a third indication to allow the network flow, and when the score satisfies a second threshold, generate a fourth indication to block the network flow.

Example 40 includes the non-transitory computer readable storage medium of example 39, wherein the first threshold is satisfied when the score is below a first threshold value, wherein the second threshold is satisfied when the score is above a second threshold value, the first threshold value different from the second threshold value, and wherein the instructions, when executed, cause the at least one processor to transmit the telemetry data to the external network to perform off-path classification when the first threshold value and the second threshold value are not satisfied.

Example 41 includes the non-transitory computer readable storage medium of example 36, wherein the instructions, when executed, cause the at least one processor to obtain a lightweight machine learning model from an external network, the external network further including a full neural network model.

Example 42 includes the non-transitory computer readable storage medium of example 36, wherein the network device is an Internet of Things device, and wherein computer processing resources are conserved in the at least one processor in response to storing the device specific allow list and the device specific block list.

Example 43 includes a method comprising obtaining telemetry data corresponding to a network flow of a network device, when a parameter in the telemetry data matches a global block list or a device specific block list, generating a first indication to block the network flow, when the parameter in the telemetry data matches a device specific allow list, generating a second indication to allow the network flow, blocking network flow in response to obtaining the first indication, and allowing the network flow in response to obtaining the second indication.

Example 44 includes the method of example 43, further including dynamically obtaining the device specific block list and the device specific allow list from an external network based on the network device, and storing a lightweight machine learning model, the lightweight machine learning model generated based on parameters obtained from the telemetry data corresponding to the network flow of the network device.

Example 45 includes the method of example 44, further including executing the lightweight machine learning model using the parameter in the telemetry data to obtain a score.

Example 46 includes the method of example 45, further including when the score satisfies a first threshold, generating a third indication to allow the network flow, and when the score satisfies a second threshold, generating a fourth indication to block the network flow.

Example 47 includes the method of example 46, wherein the first threshold is satisfied when the score is below a first threshold value, wherein the second threshold is satisfied when the score is above a second threshold value, the first threshold value different from the second threshold value, further including transmitting the telemetry data to the external network to perform off-path classification when the first threshold value and the second threshold value are not satisfied.

Example 48 includes the method of example 43, further including obtaining a lightweight machine learning model from an external network, the external network further including a full neural network model.

Example 49 includes the method of example 43, wherein the network device is an Internet of Things device, and further including processing resources in response to storing the device specific allow list and the device specific block list.

Example 50 includes a server to distribute first instructions on a network, the server comprising at least one storage device including second instructions, and at least one processor to execute the second instructions to transmit the first instructions over the network, the first instructions, when executed, to cause at least one device to obtain telemetry data corresponding to a network flow of a network device, when a parameter in the telemetry data matches a global block list or a device specific block list, generate a first indication to block the network flow, when the parameter in the telemetry data matches a device specific allow list, generate a second indication to allow the network flow, block network flow in response to obtaining the first indication, and allow the network flow in response to obtaining the second indication.

Example 51 includes the server of example 50, wherein the first instructions, when executed, cause the at least one device to dynamically obtain the device specific block list and the device specific allow list from an external network based on the network device, and store a lightweight machine learning model, the lightweight machine learning model generated based on parameters obtained from the telemetry data corresponding to the network flow of the network device.

Example 52 includes the server of example 51, wherein the first instructions, when executed, cause the at least one device to execute the lightweight machine learning model using the parameter in the telemetry data to obtain a score.

Example 53 includes the server of example 52, wherein the first instructions, when executed, cause the at least one device to when the score satisfies a first threshold, generate a third indication to allow the network flow, and when the score satisfies a second threshold, generate a fourth indication to block the network flow.

Example 54 includes the server of example 53, wherein the first threshold is satisfied when the score is below a first threshold value, wherein the second threshold is satisfied when the score is above a second threshold value, the first threshold value different from the second threshold value, and wherein the first instructions, when executed, cause the at least one device to transmit the telemetry data to the external network to perform off-path classification when the first threshold value and the second threshold value are not satisfied.

Example 55 includes the server of example 50, wherein the first instructions, when executed, cause the at least one device to obtain a lightweight machine learning model from an external network, the external network further including a full neural network model.

Example 56 includes the server of example 50, wherein the network device is an Internet of Things device, and wherein the first instructions, when executed, cause the at least one device to conserve computer processing resources in response to storing the device specific allow list and the device specific block list.

The following claims are hereby incorporated into this Detailed Description by this reference, with each claim standing on its own as a separate embodiment of the present disclosure.

What is claimed is:

1. An apparatus comprising:
    interface circuitry to obtain first telemetry data including a first transport layer security (TLS) parameter;
    a gateway;
    at least one memory;
    machine readable instructions; and
    programmable circuitry to at least one of instantiate or execute the machine readable instructions to:
        generate a global block list using a first machine learning model, the first machine learning model generated based on a device specific block list, a device specific allow list, and the first TLS parameter;
        transmit the global block list to the gateway, the gateway to perform on-path classification of a second TLS parameter of second telemetry data based on a score indicative of a likelihood that the second telemetry data is malicious, the on-path classification based on a comparison of the second TLS parameter to the device specific block list, a comparison of the second TLS parameter to the device specific allow list, and the score, the score output by a second machine learning model; and
        when the score fails to satisfy a threshold, transmit the second telemetry data for off-path analysis using the first machine learning model.

2. The apparatus of claim 1, wherein the programmable circuitry is to at least one of instantiate or execute the machine readable instructions to:
    generate the second machine learning model using the first machine learning model, the device specific allow list, and the device specific block list.

3. The apparatus of claim 2, wherein the second machine learning model is a light-weight machine learning model, and the first machine learning model is a full neural network machine learning model.

4. The apparatus of claim 2, wherein the interface circuitry is to obtain third telemetry data from the gateway, the third telemetry data obtained when the gateway is unsuccessful in performing on-path classification.

5. The apparatus of claim 4, wherein the programmable circuitry is to at least one of instantiate or execute the machine readable instructions to use the first machine learning model to facilitate off-path classification of the third telemetry data.

6. The apparatus of claim 1, wherein the programmable circuitry is to at least one of instantiate or execute the machine readable instructions to:
generate the device specific block list, the device specific block list including first parameters of the first telemetry data known to be malicious; and
generate the device specific allow list, the device specific allow list including second parameters of the first telemetry data known to be benign.

7. The apparatus of claim 1, wherein the programmable circuitry is to at least one of instantiate or execute the machine readable instructions to store the first machine learning model, the global block list, the device specific allow list, and the device specific block list for use in performing off-path classification.

8. A non-transitory computer readable storage medium comprising instructions to cause programmable circuitry to at least:
obtain first telemetry data including a first transport layer security (TLS) parameter;
generate a global block list using a first machine learning model, the first machine learning model based on a device specific block list, a device specific allow list, and the first TLS parameter;
transmit the global block list to a gateway, wherein the instructions cause the gateway to perform on-path classification of a second TLS parameter of second telemetry data based on a score indicative of a likelihood that the second telemetry data is malicious, the on-path classification based on a comparison of the second TLS parameter to the device specific block list, the device specific allow list, and an output of a second machine learning model; and
when the score fails to satisfy a threshold, transmit the second telemetry data for off-path analysis using the first machine learning model.

9. The non-transitory computer readable storage medium of claim 8, wherein the instructions are to cause the programmable circuitry to:
generate the device specific block list, the device specific block list including firsts parameters of the first telemetry data known to be malicious;
generate the device specific allow list, the device specific allow list including second parameters of the first telemetry data known to be benign;
generate the first machine learning model based on the device specific block list and the device specific allow list; and
generate the second machine learning model using the first machine learning model, the device specific allow list, and the device specific block list.

10. The non-transitory computer readable storage medium of claim 9, wherein the second machine learning model is a light-weight machine learning model, and the first machine learning model is a full neural network machine learning model.

11. The non-transitory computer readable storage medium of claim 9, wherein the instructions are to cause the programmable circuitry to obtain third telemetry data from the gateway, the third telemetry data obtained when the gateway is unsuccessful in performing on-path classification.

12. The non-transitory computer readable storage medium of claim 11, wherein the instructions are to cause the programmable circuitry to use the first machine learning model to facilitate off-path classification of the third telemetry data.

13. The non-transitory computer readable storage medium of claim 12, wherein the instructions are to cause the programmable circuitry to transmit a result of the off-path classification to the gateway.

14. The non-transitory computer readable storage medium of claim 8, wherein the instructions are to cause the programmable circuitry to store the first machine learning model, the global block list, the device specific allow list, and the device specific block list for use in performing off-path classification.

15. A method comprising:
obtaining first telemetry data including a first transport layer security (TLS) parameter;
generating a global block list using a first machine learning model, the first machine learning model based on a device specific block list, a device specific allow list and the first TLS parameter;
transmitting the global block list to a gateway,
causing the gateway to perform on-path classification of a second TLS parameter of second telemetry data based on a score indicative of a likelihood that the second telemetry data is malicious, the on-path classification based on a comparison of the second TLS parameter to the device specific block list, a comparison of the second TLS parameter to the device specific allow list, and the score output by a second machine learning model; and
when the score fails to satisfy a threshold, transmitting the second telemetry data for off-path analysis using the first machine learning model.

16. The method of claim 15, further including: generating the second machine learning model using the first machine learning model, the device specific allow list, and the device specific block list.

17. The method of claim 16, wherein the second machine learning model is a light-weight machine learning model, and the first machine learning model is a full neural network model.

18. The method of claim 16, further including obtaining third telemetry data from the gateway, the third telemetry data obtained when the gateway is unsuccessful in performing on-path classification.

19. The method of claim 18, further including using the first machine learning model to facilitate off-path classification of the third telemetry data.

20. The method of claim 19, further including:
generating the device specific block list, the device specific block list including first parameters of the first telemetry data known to be malicious;
generating the device specific allow list, the device specific allow list including second parameters of the first telemetry data known to be benign; and
generating the second machine learning model based on the device specific block list and the device specific allow list.

21. The method of claim 15, further including storing the first machine learning model, the global block list, the device specific allow list, and the device specific block list for use in performing off-path classification.

* * * * *